United States Patent
Ron et al.

(10) Patent No.: US 11,176,495 B1
(45) Date of Patent: Nov. 16, 2021

(54) MACHINE LEARNING MODEL ENSEMBLE FOR COMPUTING LIKELIHOOD OF AN ENTITY FAILING TO MEET A TARGET PARAMETER

(71) Applicant: Liquidity Capital M. C. Ltd., Bnei-Brak (IL)

(72) Inventors: Daniel Ron, Tel Aviv (IL); Meir Moti, Modi'in-Maccabim-Re'ut (IL); Maymon Oron, Tel Aviv (IL)

(73) Assignee: Liquidity Capital M. C. Ltd., Bnei-Brak (IL)

( * ) Notice: Subject to any disclaimer, the term of this patent is extended or adjusted under 35 U.S.C. 154(b) by 0 days.

(21) Appl. No.: 16/907,251

(22) Filed: Jun. 21, 2020

(51) Int. Cl.
*G06N 20/20* (2019.01)
*G06N 7/00* (2006.01)
(Continued)

(52) U.S. Cl.
CPC .............. *G06N 20/20* (2019.01); *G06N 7/005* (2013.01); *G06Q 10/0635* (2013.01); *G06Q 10/06375* (2013.01); *G06Q 10/0875* (2013.01); *G06Q 10/10* (2013.01); *G06Q 30/016* (2013.01); *G06Q 30/0201* (2013.01); *G06Q 40/02* (2013.01);
(Continued)

(58) Field of Classification Search
CPC ...... G06N 20/20; G06N 7/005; G06Q 40/025; G06Q 10/0635; G06Q 40/12; G06Q 10/06375; G06Q 10/0875; G06Q 10/10; G06Q 30/016; G06Q 30/0201; G06Q 40/02; G06Q 50/01; G06K 9/623; G06F 3/0484
See application file for complete search history.

(56) References Cited

U.S. PATENT DOCUMENTS

| 8,244,652 B2 * | 8/2012 | Menahem | G06N 5/043 706/20 |
| 2005/0246256 A1 * | 11/2005 | Gastineau | G06Q 40/025 705/35 |

(Continued)

OTHER PUBLICATIONS

Vrugt et al., "Ensemble Bayesian model averaging using Markov Chain Monte Carlo sampling," Environ Fluid Mech (2008) 8:579-595, DOI 10.1007/s10652-008-9106-3 (Year: 2008).*

(Continued)

*Primary Examiner* — Miranda M Huang
*Assistant Examiner* — Yao David Huang

(57) ABSTRACT

There is provided a method of generating a machine learning (ML) model ensemble for computing likelihood of an entity failing to meet a target parameter, comprising: training ML-sub-models that each output sub-values for an input of raw data elements, training a principal ML model that outputs a value of an entity parameter corresponding to the target parameter for an input of the sub-values, using a training dataset including for sample entities, the ML-sub-values and corresponding entity parameters, inputting raw data elements associated with the entity into the ML-sub-models to obtain respective sub-values, in iterations: computing simulated adjustments to the sub-values to generate adjusted sub-values that are inputted into the principal ML model to obtain simulated values for the entity parameter, and generating a risk classifier that generates a likelihood of the entity failing to meet the target parameter according to an analysis of the simulated values for the entity parameter.

25 Claims, 6 Drawing Sheets

(51) Int. Cl.
  *G06Q 50/00* (2012.01)
  *G06Q 10/06* (2012.01)
  *G06Q 30/02* (2012.01)
  *G06Q 10/10* (2012.01)
  *G06Q 40/00* (2012.01)
  *G06Q 30/00* (2012.01)
  *G06Q 10/08* (2012.01)
  *G06Q 40/02* (2012.01)
  *G06F 3/0484* (2013.01)

(52) U.S. Cl.
  CPC ............. *G06Q 40/12* (2013.12); *G06Q 50/01* (2013.01); *G06F 3/0484* (2013.01)

(56) References Cited

U.S. PATENT DOCUMENTS

| | | | | |
|---|---|---|---|---|
| 2006/0136410 | A1* | 6/2006 | Gaussier | G06K 9/623 |
| 2014/0279741 | A1* | 9/2014 | Sow | G06N 20/00 |
| | | | | 706/12 |
| 2015/0095075 | A1* | 4/2015 | Breuer | G06Q 20/409 |
| | | | | 705/7.12 |
| 2015/0095210 | A1* | 4/2015 | Grech | G06Q 40/025 |
| | | | | 705/38 |
| 2015/0178638 | A1* | 6/2015 | Deshpande | G06Q 40/00 |
| | | | | 706/12 |
| 2018/0357714 | A1* | 12/2018 | So | G06Q 40/025 |
| 2019/0073714 | A1* | 3/2019 | Fidanza | G06Q 20/342 |
| 2019/0114704 | A1* | 4/2019 | Way | G06Q 40/025 |
| 2020/0042903 | A1* | 2/2020 | Moazzami | G06N 20/20 |
| 2020/0065897 | A1* | 2/2020 | McBride | G06Q 40/025 |
| 2020/0097858 | A1* | 3/2020 | Baikalov | G06K 9/623 |
| 2020/0210812 | A1* | 7/2020 | Baker | G06N 3/0481 |
| 2020/0279150 | A1* | 9/2020 | Shazeer | G06N 3/0454 |

OTHER PUBLICATIONS

Chowdhury et al., "Meta-Meta Classification for One-Shot Learning," arXiv:2004.08083v4 [cs.LG] Jun. 14, 2020 (Year: 2020).*

* cited by examiner

MACHINE LEARNING MODEL ENSEMBLE FOR COMPUTING LIKELIHOOD OF AN ENTITY FAILING TO MEET A TARGET PARAMETER

FIELD AND BACKGROUND OF THE INVENTION

The present invention, in some embodiments thereof, relates to machine learning (ML) and, more specifically, but not exclusively, to systems and methods for training and using a ML model ensemble for computing risk of an entity failing to meet a target parameter.

Predictions of whether a certain entity is able to meet a target value are usually based on a historical analysis of the entity. Past success in meeting past targets are indicative of future success in meeting the target, and historical failures in meeting the historical targets are usually indicative of predicted failure to meet the target in the future. Another approach is to look at other entities. Whether other entities have been successful or have failed in meeting their historical targets, is used as an indication for the current entity's ability to meet its own target.

SUMMARY OF THE INVENTION

According to a first aspect, a method of generating a machine learning (ML) model ensemble for computing likelihood of an entity failing to meet a target parameter, comprises: training a plurality of ML-sub-models that each respective output sub-values in response to an input of raw data elements, training a principal ML model that output a value of an entity parameter corresponding to the target parameter in response to an input of the plurality of sub-values outputted by the plurality of ML-sub-models, using a training dataset including for each of a plurality of sample entities, the plurality of ML-sub-values and corresponding entity parameters, inputting a plurality of raw data elements associated with the entity into the plurality of ML-sub-models to obtain an output of respective sub-values, in a plurality of iterations: computing a plurality of simulated adjustments to the plurality of obtained sub-values to generate a plurality of adjusted sub-values, inputting the plurality of adjusted sub-values into the principal ML model, obtaining from the principal ML model in the plurality of iterations, a plurality of simulated values for the entity parameter, and generating a risk classifier that generates a likelihood of the entity failing to meet the target parameter according to an analysis of the plurality of simulated values for the entity parameter.

According to a second aspect, a method of dynamically and iteratively using a ML model ensemble for computing likelihood of an entity failing to meet a target parameter, comprises: in a plurality of first iterations: receiving a request from an entity to obtain a target parameter, receiving a plurality of raw data elements extracted by code sensors installed on a plurality of network nodes and injected into a server in real time, inputting the plurality of raw data elements into a plurality of ML-sub-models, obtaining a plurality of sub-values from the plurality of ML-sub-models in a plurality of second iterations: computing a plurality of simulated adjustments to the plurality of obtained sub-values to generate a plurality of adjusted sub-values, inputting the plurality of adjusted sub-values into a principal ML model, obtaining from the principal ML model in the plurality of second iterations, a plurality of simulated values for the entity parameter, inputting the plurality of simulated values into a risk classifier that computes a likelihood of the entity failing to meet the target parameter according to an analysis of the plurality of simulated values for the entity parameter, automatically providing the target parameter to the entity when the likelihood is below a threshold, and automatically denying the request for the target parameter when the likelihood is above the threshold.

According to a third aspect, a system for generating a machine learning (ML) model ensemble for computing likelihood of an entity failing to meet a target parameter, comprises: at least one hardware processor executing a code for: training a plurality of ML-sub-models that each respective output sub-values in response to an input of raw data elements, training a principal ML model that output a value of an entity parameter corresponding to the target parameter in response to an input of the plurality of sub-values outputted by the plurality of ML-sub-models, using a training dataset including for each of a plurality of sample entities, the plurality of ML-sub-values and corresponding entity parameters, inputting a plurality of raw data elements associated with the entity into the plurality of ML-sub-models to obtain an output of respective sub-values, in a plurality of iterations: computing a plurality of simulated adjustments to the plurality of obtained sub-values to generate a plurality of adjusted sub-values, inputting the plurality of adjusted sub-values into the principal ML model, obtaining from the principal ML model in the plurality of iterations, a plurality of simulated values for the entity parameter, and generating a risk classifier that generates a likelihood of the entity failing to meet the target parameter according to an analysis of the plurality of simulated values for the entity parameter.

In a further implementation form of the first, second, and third aspects, further comprising: iteratively obtaining updates of the plurality of raw data elements, iteratively inputting the updates of the plurality of raw data elements into the plurality of ML-sub-models to obtain updated respective sub-values, in a plurality of updated iterations: computing the plurality of simulated adjustments to the plurality of updated respective sub-values to obtain a plurality of adjusted updated sub-values, inputting the plurality of adjusted updated sub-values into the principal ML model, obtaining a plurality of simulated updated values for the entity parameter, and generating an update of the risk classifier using an updated analysis of the plurality of simulated updated values, for generating an updated likelihood of the entity failing to meet the target parameter.

In a further implementation form of the first, second, and third aspects, the principal ML model includes a function of a plurality of parameters associated with the plurality of sub-values outputted by the plurality of ML-sub-models, the plurality of parameters associated with a plurality of weights, and training the principal ML model comprises learning the plurality of weights.

In a further implementation form of the first, second, and third aspects, the plurality of weights of the function are computed based on automated combinatorial variance scenarios that impact the entity parameter.

In a further implementation form of the first, second, and third aspects, further comprising receiving a threshold denoting risk of the entity failing to meet the target parameter, and wherein the analysis comprises computing the likelihood by computing an entity score based on the simulated values above or under the threshold relative to the whole set of simulated values.

In a further implementation form of the first, second, and third aspects, further comprising: determining a likelihood of the entity meeting the target parameter when the entity score is above the target parameter.

In a further implementation form of the first, second, and third aspects, the plurality of raw data elements associated with the entity are selected from the group consisting of: structured data obtained from structured data source storing data of the entity, numerical data obtained from data sources computing the numerical data for the entity, and unstructured data obtained from open source and/or social networks.

In a further implementation form of the first, second, and third aspects, at least one of the plurality of ML-sub-models is selected from the group consisting of: (i) outputs a respective metric based on a correlation window between values of a certain type of the raw data element obtained during a first time interval, and values of the certain type of raw data element obtained during at least one second time interval prior to the first time interval, (ii) computes a respective metric when fed values of a defined set of types of raw data elements, (iii) computes a respective metric by an aggregation of a combination of a plurality of sub-sub-models selected according to a type of the entity, (iv) a sub-classifier that outputs a probability of the entity to meet the target parameter when fed a selected set of raw data elements, the sub-classifier trained on a training dataset that includes, for each of a plurality of sample entities, sample data elements associated with the respective sample entity, and an indication of meeting a respective target parameter provided to the respective sample entity, (v) outputs risk of failure of one component of a plurality of components of the entity on the entity parameter, (vi) outputs measures and/or prediction parameters based on an analysis of raw data elements indicative of users accessing a web site associated with the entity, (vii) outputs an indication of users within the entity based on an analysis of profiles of the users posted on social networks hosted by external social network servers, and (viii) outputs measures and/or prediction parameters based on an analysis of marketing elements indicative of users interacting with ads and/or promotions associated with the entity.

In a further implementation form of the first, second, and third aspects, the plurality of simulated adjustments are computed based on a probabilistic simulation model and a set of prior distribution, given or calculated from the raw data.

In a further implementation form of the first, second, and third aspects, the features of the method are implemented by at least one hardware processor executing on a server, wherein the raw data elements are extracted by code sensors installed on a plurality of network nodes and injected into the server in real time.

In a further implementation form of the first, second, and third aspects, the entity comprises a company, wherein the target parameter defined in a request comprises funds defined in a funding request for financing the company, and the entity parameter comprises financial assets of the entity used to pay back the funds of the funding request.

In a further implementation form of the first, second, and third aspects, the plurality of raw data elements associated with the entity are selected from the group consisting of: data elements indicative of customers of the company, data elements indicative of financial details of the company, and data elements obtained from third party sources related to the company.

In a further implementation form of the first, second, and third aspects, at least one of the plurality of ML-sub-models outputs a respective metric and/or prediction parameter selected from the group consisting of: (i) indication of growth of the company computed as a ratio between revenue during a first time interval, and revenue obtained during at least one second time interval prior to the first time interval, wherein the revenue is computed based on a plurality of first types of raw data elements including invoices and/or payments obtained from billing and/or accounting system integration, (ii) indication of customer churn computed based on a plurality of second types of raw data elements including invoices and/or payments and/or data obtained from customer relationship management (CRM) systems, (iii) indication of gross margins computed based on a plurality of third types of raw data elements, (iv) indication of unit economics computed as an aggregation of a combination of a plurality of sub-sub-models selected according to a business type of the company, (v) a sub-classifier that outputs probability of the company to raise funds when fed a plurality of fourth types of raw data elements, the sub-classifier trained on a training dataset that includes, for each of a plurality of sample companies, values of the fourth types of data elements, and an indication of funds raised by the respective company, (vi) outputs risk of failure of one revenue generating unit of a plurality of revenue generating units of the company on the company, based on computing a statistical distribution of the plurality of revenue generating units when fed a plurality of fifth types of data elements, (vii) outputs measures and/or prediction parameters based on an analysis of a sixth type of data elements indicative of users accessing a web site associated with the company, and/or based on an analysis of a seventh type of data elements indicative of users interacting with presented advertisements, (viii) outputs an indication of employee replacement within the company based on an analysis of employee profiles posted on social networks hosted by external social network servers and/or additional external sources hosted by network nodes, (ix) outputs an indication of real time short and/or long term cost predictions and/or detected expected significant cost changes due to external contractor contrast, and/or changes in supplied service prices, and/or bill of materials (BOM) and/or ongoing purchase orders, based on an analysis of commitments including contracts and/or purchase orders obtained via enterprise resource planning (ERP) system integration.

In a further implementation form of the first, second, and third aspects, further comprising: iteratively obtaining updates of the plurality of raw data elements, iteratively inputting the updates of the plurality of raw data elements into the plurality of ML-sub-models to obtain updated respective sub-values, in a plurality of updated iterations: computing the plurality of simulated adjustments to the plurality of updated respective sub-values to obtain a plurality of adjusted updated sub-values, inputting the plurality of adjusted updated sub-values into the principal ML model, obtaining a plurality of simulated updated values for the entity parameter, inputting the plurality of simulated updated values into the risk classifier for generating an updated likelihood of the entity failing to meet the target parameter according to an analysis of the plurality of simulated updated values for the entity parameter.

In a further implementation form of the first, second, and third aspects, further comprising: computing a trend according to the iteratively computed updated likelihood of the entity parameter failing to meet the target parameter, and extrapolating the trend to a future time for predicting a trend when the likelihood of the entity failing to meet the target parameter is above a threshold.

In a further implementation form of the first, second, and third aspects, further comprising: monitoring for a change in statistics of at least one of the plurality of raw data elements, and triggering the iterations when the change in statistics is significant.

In a further implementation form of the first, second, and third aspects, further comprising: analyzing the plurality of weights of the function to identify a plurality of influencing weights that most influence values of the entity parameter, and computing, a set of sub-functions, each sub-function corresponding to a certain influencing weight for correlating between at least one raw data element and value of the entity parameters.

In a further implementation form of the first, second, and third aspects, in response to iteratively obtaining updates of the plurality of raw data elements, an interactive graphical user interface (GUI) presented on a display of a client terminal is dynamically updated with an indication of an entity score indicative of likelihood of the entity failing to meet the target parameter, and the amount of pre-approved funding available for the company determined based on dynamically computed likelihood of obtaining sufficient financial assets to pay back the pre-approved funding.

In a further implementation form of the first, second, and third aspects, further comprising: receiving, via the GUI, a request for an amount of funding up to the amount of pre-approved funding presented in the GUI, and automatically providing the amount of funding to an account of the company.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
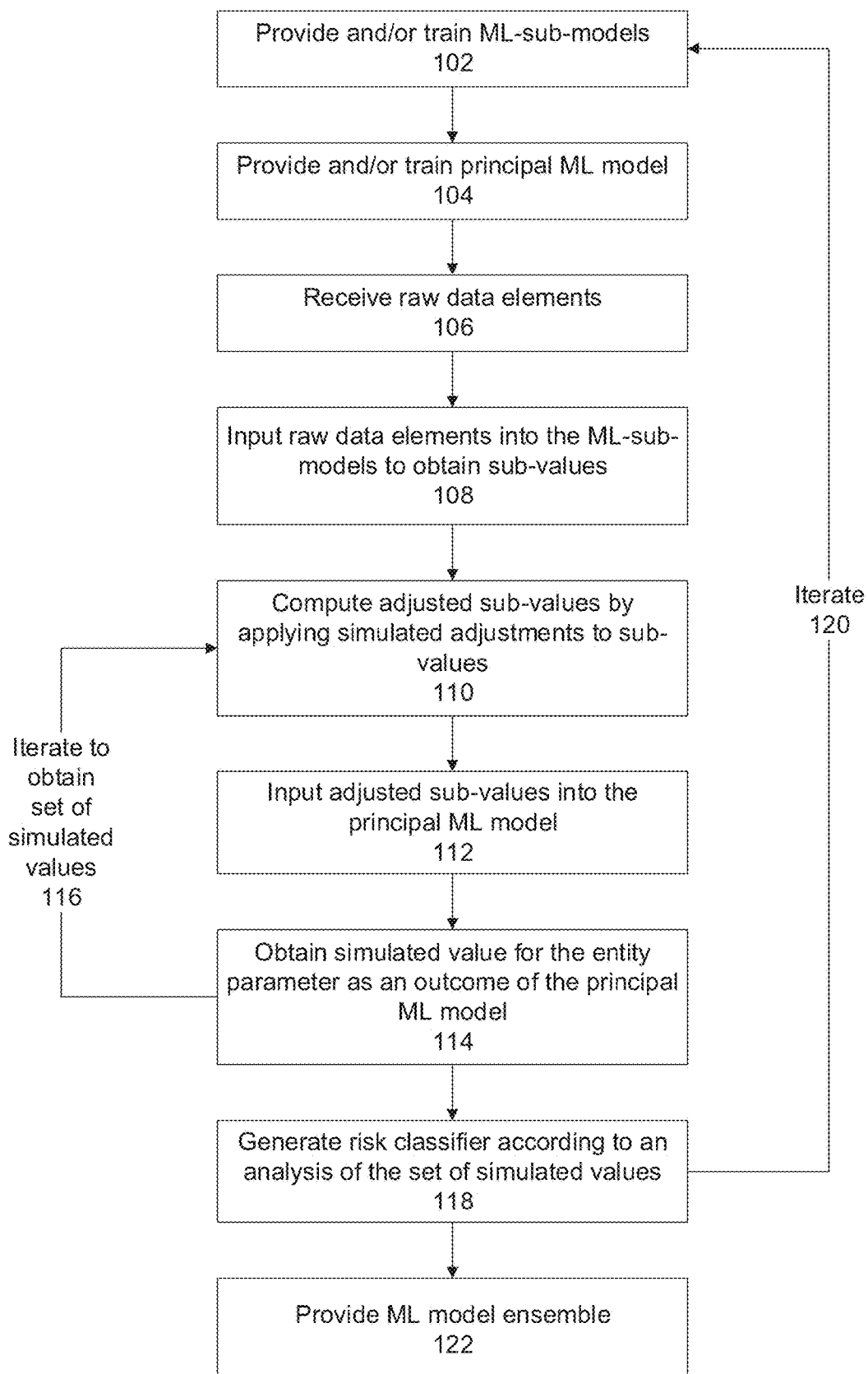
FIG. 1A is a flowchart of a method for generating a ML model ensemble for computing likelihood of an entity failing to meet a target parameter, in accordance with some embodiments of the present invention.

The present invention, in some embodiments thereof, relates to machine learning (ML) and, more specifically, but not exclusively, to systems and methods for training and using a ML model ensemble for computing risk of an entity failing to meet a target parameter.

An aspect of some embodiments of the present invention relate to systems, methods, an apparatus, and/or code instructions (stored in a memory and executable by one or more hardware processors) for generating a machine learning model ensemble for computing likelihood (sometimes the term computing likelihood is interchangeable with the term predicting risk) of an entity failing to meet a target parameter. The ML model ensemble includes the following components: (i) ML-sub-models that generate an outcome of sub-values in response to an input of raw data elements, (ii) a principal ML model that generates an outcome of a value of an entity parameter corresponding to the target parameter in response to an input of the sub-values outputted by the ML-sub-models, and (iii) a risk classifier that generates a likelihood of the entity failing to meet the target parameter according to an analysis of simulated values for the entity parameter. The simulated values are generated by computing simulated adjustments to the obtained sub-values to generate adjusted sub-values. The adjusted sub-values are inputted into the ML-model to obtain the simulated values. The ML model ensemble may be customized, i.e., computed per entity. The ML model ensemble is dynamically updated and dynamically used to dynamically compute the likelihood of the entity failing to meet a target parameter, according to dynamic adjustments to the raw data elements. Real-time likelihood is generated according to real time status of the raw data elements.

The ML model ensemble may be generated using the following exemplary process. Multiple ML-sub-models, each respectively outputting sub-value(s) in response to an input of corresponding raw data element(s), are trained. The principal ML model outputs a value of an entity parameter corresponding to the target parameter in response to an input of the sub-values outputted by the ML-sub-models, is trained. The principal ML model may be trained using a training dataset including for each of sample entities, ML-sub-values (outputted by the ML-sub-models in response to an input of raw data elements associated with the respective sample entity) and corresponding entity parameters (i.e., serving as ground truth). Raw data elements associated with the entity are inputted into the trained ML-sub-models to obtain an output of respective sub-values. In multiple iterations: simulated adjustments to the obtained sub-values are computed to generate adjusted sub-values. The adjusted sub-values are inputted into the principal ML model. A set of multiple simulated values for the entity parameter are obtained as an outcome of the principal ML model over the iterations. A risk classifier that generates a likelihood of the entity failing to meet the target parameter is generated as a process for analyzing the set of simulated values for the entity parameter. The ML model ensemble, which includes the ML-sub-models, the principal ML model, and the risk classifier, is provided.

The ML model ensemble may be used to compute likelihood of the entity failing to meet the target parameter using the following exemplary process. A request from an entity to obtain a target parameter is received. Raw data elements, optionally extracted by code sensors installed on network nodes and injected into a server in real time, are received. The raw data elements are inputted into the ML-sub-models. Sub-values are obtained as outcomes of the ML-sub-models.

Simulated adjustments to the obtained sub-values may be computed to generate adjusted sub-values, which are inputted into the principal ML model to obtain simulated values for the entity parameter. The process of computing the simulated adjustments may be iterated to obtain a set of simulated values for the entity parameter. The set of simulated values are inputted into a risk classifier that computes a likelihood of the entity failing to meet the target parameter. The risk classifier computes the likelihood according to an analysis of the set simulated values for the entity parameter. The risk classifier may compute an entity score indicative of likelihood of the entity failing to meet the target parameter. The entity score may be computed by a function applied to a subset of the individual simulated values that are above a threshold and another subset of the individual simulated values that are below the threshold defining a binary condition for meeting or failing to meet the target parameter. The features of the process may be dynamically iterated to obtain dynamic updates for the likelihood of the entity failing to meet the target parameter, for example, in response to updated requests and/or in response to update values of the raw data elements. The target parameter may be automatically provided to the entity when the likelihood is below a threshold. Alternatively, the request for the target parameter may be automatically denied when the likelihood is above the threshold.

In an example the entity is a company, for example, a sole proprietor, start-up, corporation, and/or other business related organization. The target parameter relates to monetary funds indicated in a funding request for financing the company. The entity parameter indicates financial assets of the entity used to pay back the funds of the funding request. The ML model ensemble provides a real time indication of the ability of the company to pay back the funds using existing and/or predicted financial assets and the associated risk that the company will fail to pay back the given funds. For example, the ML model ensemble provides a real time ongoing underwriting process for funding the company. The ML model ensemble determines the risk of the company to not be able to pay back current and future/additional funds. Optionally, the real time prediction of the amount of funds that the company is able to pay back, with acceptable risk, is presented in a GUI. The acceptable risk may be determined by the funding entity, for example, as the threshold described herein. The GUI may be dynamically updated to present an amount of funding that is pre-approved based on ongoing changes to the prediction of the amount of funds that are available for the company to withdraw with acceptable risk outputted by the ML model ensemble. The company may request up to the pre-amount of real time funding presented in the GUI. The amount may be automatically deposited in an account of the company.

At least some implementations of the systems, methods, apparatus, and/or code instructions described herein relate to the technical problem of computing a prediction of an entity failing to meet a target parameter when no ground truth is available, or little ground truth is available for the entity, similar in concept to single shot or few shot learning. At least some implementations of the systems, methods, apparatus, and/or code instructions described herein relate to the technical problem of dynamically efficiently computing a prediction to a target parameter of an entity, in an environment where values of raw data elements are dynamically adapted. At least some implementations of the systems, methods, apparatus, and/or code instructions descried herein improve the field of machine learning, by computing a ML model ensemble that predicts a likelihood of reaching a target value by an entity when no ground truth is available. The prediction may be for likelihood of a company accumulating sufficient assets to pay back financing in the future. In such case, no ground truth may be available when the company is relatively new and has little or no history of obtaining loans and paying them back. The ML model ensemble computes the prediction even without any historical data of whether previous predictions and/or historical data have been met in the past or not, for example, for new companies (e.g., start-ups) which have not received previous funding, and/or for which little or no historical financial data is available. Simulated adjustments, optionally Bayesian simulated adjustments, to sub-values outputted by ML-sub-models, to create adjusted sub-values which are inputted into a principal ML model (which may be customized for each respective entity) enables generating multiple simulated values for the entity parameter. Each simulated value represents one possible prediction for the entity parameter, based on a possible predicted scenario represented by the simulated adjustments. The multiple simulated values, which depict a sub-sampled distribution "space" of the infinite possible entity parameter outcomes, may be analyzed to compute an overall aggregated likelihood of the entity failing to meet the target parameter. The multiple simulated values provide sufficient data for computing the risk classifier and/or for computing the likelihood of the entity failing to meet the target parameter and/or for computing the ML model ensemble (i.e., to predict likelihood of the entity meeting the target value), even when no or little ground truth data for meeting the target parameter is actually available for the entity.

At least some implementations of the systems, methods, apparatus, and/or code instructions descried herein relate to the technical problem of improving accuracy of predicting likelihood of an entity failing to meet a target value. At least some implementations of the systems, methods, apparatus, and/or code instructions descried herein improve the field of machine learning, by computing a ML model ensemble that is customized to the entity Simulated adjustments to sub-values to obtain adjusted sub-values (as described herein) enables generating sufficient data for computing a risk classifier that generates likelihood of the entity failing to meet the target parameter. The simulated adjustments to the sub-values is customized to the particular entity, and does not necessarily rely on data of other entities. Data of other entities may be used to create the principal ML model, into which the multiple adjusted-sub values are iteratively inputted to obtain a set of simulated values for the entity parameter of the certain entity. In contrast, using standard approaches, such as neural networks and/or other standard classifiers, predictions of values are directly obtained by training on data of other sample entities that have met and not met targets as ground truth, in an attempt to use the data of sample entities to make predictions for certain entities. No simulated adjustment of sub-values of the certain entity is performed in standard approaches. Such standard classifiers, which are trained on data of other entities, are inherently less accurate that the ML model ensemble described herein, since other entities are inherently different than the present entity being analyzed. Only using data of whether or not other entities met their targets provides a less accurate estimate of whether the present entity being analyzed is likely to meet the target or not. The simulation adjustments to the sub-values to generate adjusted sub-values, which are inputted into the principal ML model to obtain a set of simulated values for the entity parameter, provide a more accurate set of simulated values for the entity parameter when the set is analyzed as a whole. The set of simulated values represents many predicted scenarios that may occur. An aggregation of the predicted scenarios provides a more accurate computation of the overall likelihood of the entity failing to meet the target parameter. In contrast, standard approaches do not consider multiple predicted scenarios, but use a standard classifier that directly output a likelihood value.

At least some implementations of the systems, methods, apparatus, and/or code instructions described herein improve the experience of a user using a computer. The improvement is at least obtained by code sensor and/or other code that obtain data elements from network nodes, feed the data elements into an ML model ensemble executing on a server, for real time updates of likelihood of an entity meeting a target value that is predicted by the ML model ensemble using the obtained data elements. For example, an amount of additional funding that a company may obtain is computed in real time based on updates of data elements from network node sources. The additional funding may be computed by the ML model ensemble based on likelihood of the company having sufficient future assets to pay back the additional funding. The real time updates may be presented in a graphical user interface (GUI), for example, a dashboard. The code sensors enable real time feeding of updated data elements into the ML model ensemble for real time updates of the user interface. For example, code sensors may stream dynamically collected data elements to the ML model ensemble, for streaming updates of the user interface. The real time updates reflect a substantial real time state of the company, based on real time data obtained by the code sensors, for example, real time access by users to a web site of the company, real time growth in revenue, and the like. Predictions of changes to future abilities to pay back funding may be computed based on trends of historical real time predictions, which may enable predictions of future funding. For example, when a company experiences monthly increases in ability to pay which translates into monthly increases in potential funding, a prediction may be made for when the company will be predicted as likely to pay back a very large amount. The user may choose to wait until the very large amount is available based on the prediction. The user may request and be approved of additional funding, in real time, rather than having to wait until sufficient historical results are available.

At least some implementations of the systems, methods, apparatus, and/or code instructions described herein relate to the technical problem of obtaining sufficient data in order to underwrite a company, optionally continuously underwrite, in particular, how to obtain and use real time data in order to provide real time underwriting for a company, and/or how to monitor changes in risk of the company that affect the underwriting. Standard approaches are based on using historical data of the company, which is not available for new companies, and does not accurately predict future scenarios that may impact the company. Other standard approaches based on using data of other companies is inaccurate since such data is not necessarily applicable to the company being evaluated. At least some implementations of the systems, methods, apparatus, and/or code instructions described herein provide a solution to the technical problem, by using feed raw data elements associated with the company into ML-sub-models to obtain sub-values, and computing simulated adjustments to the sub-values to obtain adjusted sub-values. The simulated distribution based adjustments represent multiple different plausible predicted scenarios, for example, rather than trying to make a single prediction. The adjusted sub-values are inputted into the principal ML model trained using data of other companies or collaborative experts' knowledge, which may provide a prediction based on the data of other companies and/or many subject matter experts analysis expertise (reinforcement learning). The multiple simulated values obtained from the principal ML model represent many different predictions for the company which represent a plausible (local) sub sampled space of the infinite scenarios space of the company. The generated risk classifier analyzes the multiple simulated values in order to arrive at an overall most likely scenario, representing an overall (e.g., single) predictive likelihood of the entity failing to meet the target parameter. The ML model ensemble described herein provides an increased accuracy of likelihood of the entity failing to meet the target parameter, and/or increased accuracy of real time monitoring of the likelihood of the entity failing to meet the target parameter, for example, in comparison to standard underwriting approaches.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
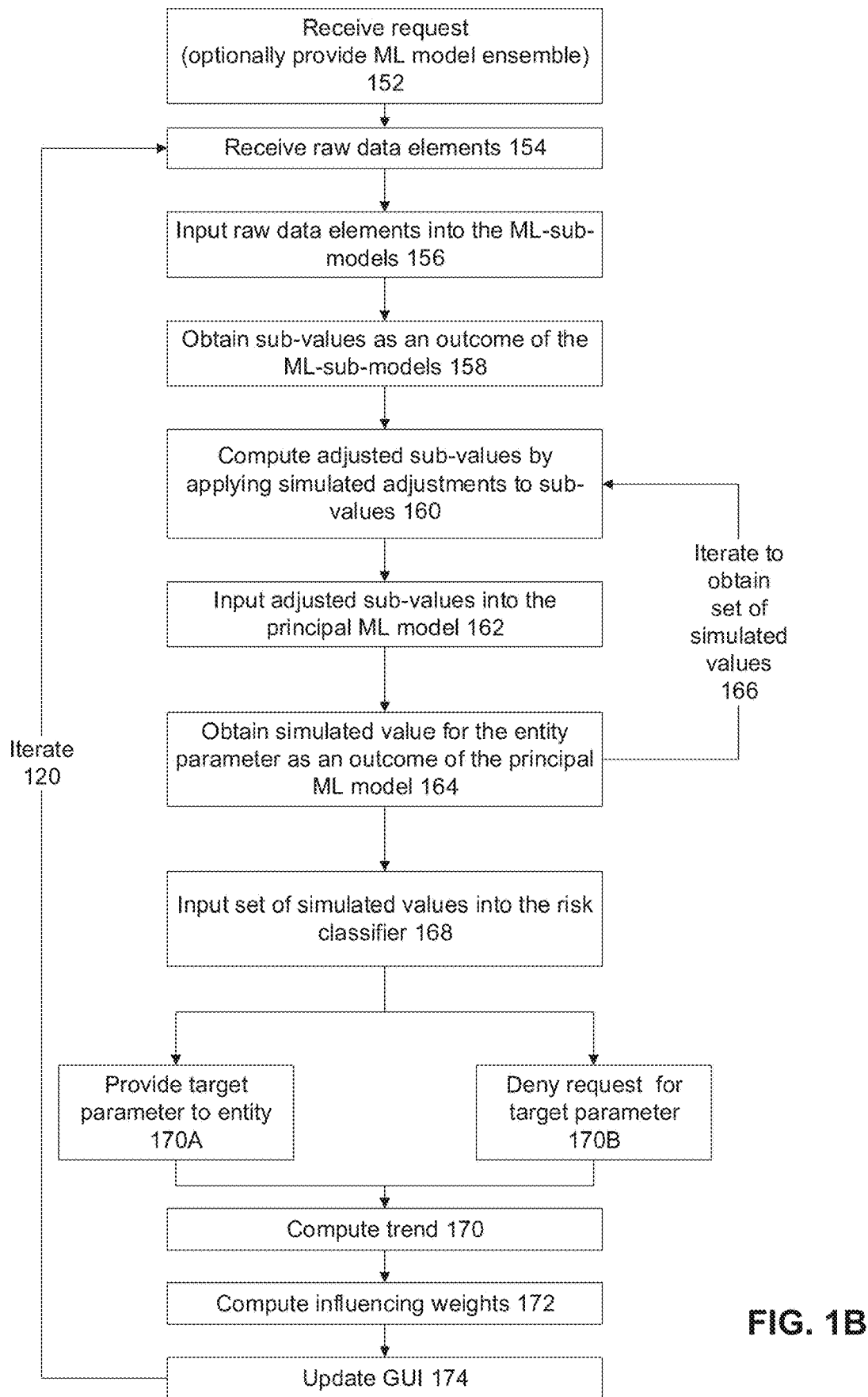
FIG. 1B is a flowchart of a method for using the ML model ensemble for computing likelihood of an entity failing to meet a target parameter, in accordance with some embodiments of the present invention.
Figure 2:
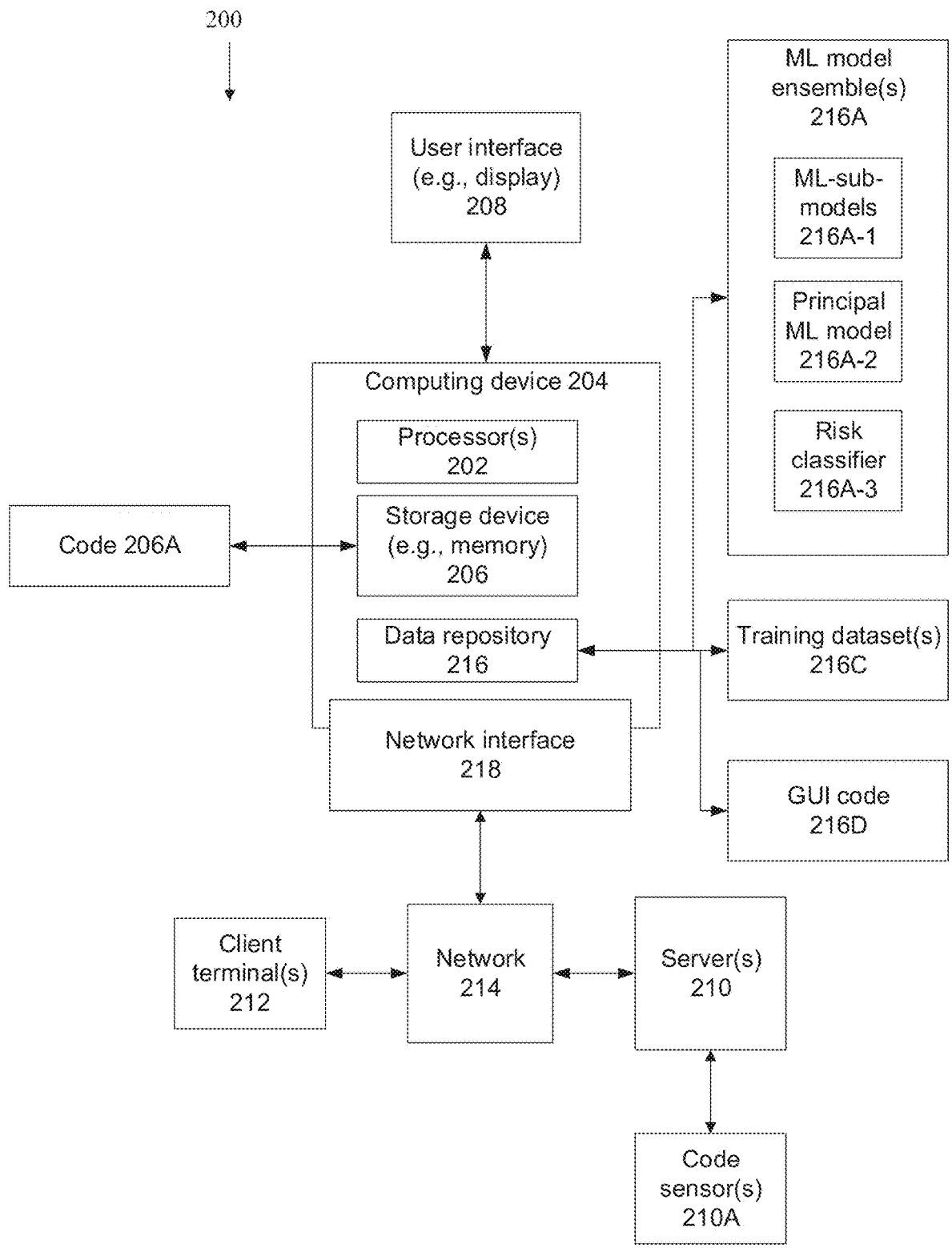
FIG. 2 is a block diagram of a system for generating a ML model ensemble and/or using the ML model ensemble for computing likelihood of an entity failing to meet a target parameter, in accordance with some embodiments of the present invention.

Reference is now made to FIG. 1A, which is a flowchart of a method for generating a ML model ensemble for computing likelihood of an entity failing to meet a target parameter, in accordance with some embodiments of the present invention. Reference is also made to FIG. 1B, which is a flowchart of a method for using the ML model ensemble for computing likelihood of an entity failing to meet a target parameter, in accordance with some embodiments of the present invention. Reference is also made to FIG. 2, which is a block diagram of a system 200 for generating a ML model ensemble and/or using the ML model ensemble for computing likelihood of an entity failing to meet a target parameter, in accordance with some embodiments of the present invention. System 200 may implement the acts of the method described with reference to FIGS. 1A and/or 1B, by processor(s) 202 of a computing device 204 executing code instructions 206A stored in a storage device 206 (also referred to as a memory and/or program store).

Multiple architectures of system 200 based on computing device 204 may be implemented. In an exemplary implementation, computing device 204 storing code 206A may be implemented as one or more servers (e.g., network server, web server, a computing cloud, a virtual server) that provides services (e.g., one or more of the acts described with reference to FIGS. 1A and/or 1B) to one or more client terminals 212 over a network 214, for example, providing software as a service (SaaS) to the client terminal(s) 212, providing software services accessible using a software interface (e.g., application programming interface (API), software development kit (SDK)), providing an application for local download to the client terminal(s) 212, and/or providing functions using a remote access session to the client terminals 212, such as through a web browser. For example, multiple users use their respective client terminals 212 to subscribe to services that are centrally provided by computing device 204. Alerts and/or updates are provided to the respective client terminals 212 by computing device 204. In another example, computing device 204 may include locally stored software (e.g., code 206A) that performs one or more of the acts described with reference to FIGS. 1A and/or 1B, for example, as a self-contained client terminal that is designed to be used by users of the client terminal.

In another example, each client terminals 212 may obtain their respective ML model ensembles 216A, which may be customized, from computing device 204 (which may compute and/or update ML model ensemble 216A as described herein) for local installation and use. Each client terminal 212 may store its own custom computed trained ML model 216A ensemble for local use.

Each ML model ensemble 216A may include one or more of: ML-sub-models 216A-1, principal ML model 216A-2, and risk classifier 216A-3, as described herein.

Each ML model ensemble 216A, or components thereof, may be custom created per entity. In an exemplary implementation, ML-sub-models 216A-1 of ensemble 216A are non-customized, in the sense that the ML-sub-models 216A-1 are created using data associated with multiple different entities, and used for different entities. The principal ML model 216A-2 and the risk classifier 216A-3 may be customized for each entity. In such implementation, multiple customized ML model ensembles 216A may share common ML-sub-models 216A-1, and include customized principal ML model 216A-2 and customized risk classifier 216A-3. Servers(s) 210 (also referred to herein as network nodes) may be associated with code sensor(s) 210A (e.g., installed on a data storage device of server(s) 210 and executed by hardware processors of the server(s) 210) that extract raw data elements. The raw data elements are transmitted over network 214 to computing device 204, for example, via an API and/or SDK, as described herein.

Processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Data storage device 206 stores code instructions executable by processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 206 stores code 206A that implements one or more features and/or acts of the method described with reference to FIG. 1A-1B when executed by processor(s) 202, for example, computing correlations, computing simulated adjustments, computing simulated values, training the customized ML model, and/or generating instructions for presentation of the GUI and/or computing date for the GUI, and/or other features described with reference to FIG. 1A-1B.

Computing device 204 may include a data repository 216 for storing data, for example one or more of: ML model ensemble(s) 216A, which are computed and/or updated as described herein, training datasets 216C that store data for training the ML model ensembles(s) 216A and/or for training relevant ML-sub-models 216A-2 (e.g., received raw data elements), and/or GUI code 216D for executing the GUI described herein (e.g., locally, remotely, and/or for download to respective client terminals 212). Data repository 216 may be implemented as, for example, a memory, a local hard-drive, virtual storage, a removable storage unit, an optical disk, a storage device, and/or as a remote server and/or computing cloud (e.g., accessed using a network connection).

Network 214 may be implemented as, for example, the internet, a local area network, a virtual private network, a wireless network, a cellular network, a local bus, a point to point link (e.g., wired), and/or combinations of the aforementioned.

Computing device 204 may include a network interface 218 for connecting to network 214, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 may connect using network 214 (or another communication channel, such as through a direct link (e.g., cable, wireless) and/or indirect link (e.g., via an intermediary computing unit such as a server, and/or via a storage device) with one or more of:

Server(s) 210, from which the raw data elements (structured and/or unstructured data) are obtained.

Client terminal(s) 212, which may be used by users remotely accessing computing device 204, as described herein.

Computing device 204 and/or client terminal(s) 212 include and/or are in communication with one or more physical user interfaces 208 that include a mechanism for a user to enter data and/or view data (e.g., generated alerts and/or automated actions and/or manually required approvals), optionally within a GUI. Exemplary user interfaces 208 include, for example, one or more of, a touchscreen, a display, a keyboard, a mouse, and voice activated software using speakers and microphone.

Reference is now made to FIG. 1A, which is a flowchart of a method of generating a machine learning model ensemble for computing likelihood of an entity failing to meet a target parameter, in accordance with some embodiments of the present invention. Reference is also made to FIG. 1B, which is a flowchart of a method of using the machine learning model for computing likelihood of the entity failing to meet a target parameter, in accordance with some embodiments of the present invention.

In at least some embodiments, the ML model ensemble described herein is dynamically updated and dynamically used, which provides for a mixing of the training phase with the inference phase. It is noted the generation of the ML model ensemble as in FIG. 1A may be implemented concurrently, sequentially, in parallel, after, and/or mixed with the use of the ML model ensemble as in FIG. 1B. For example, some training features are integrated (e.g., concurrently, before, after, in parallel) with inference features, to provide a method for dynamic update and use of the ML model ensemble.

Referring now back to FIG. 1A, at 102, multiple ML-sub-models are trained and/or provided. Each ML-sub-model outputs sub-values in response to an input of respective raw data elements.

The ML-sub-models may be implemented, for example, as code that when executed computes one or more respective sub-values from the raw data elements. Exemplary implementations of ML-sub-models include one or more or combination of: a set of rules, a function, classifiers and/or neural networks of various architectures (e.g., artificial, deep, convolutional, fully connected), Markov chains, support vector machine (SVM), regressions (e.g. linear, ridge, lasso, isotonic etc), logistic regression, k-nearest neighbor, singular spectrum analysis (SSA), field aware factorization machine (FFM) and decision trees.

Exemplary ML-sub-models include one or more of:

(i) A ML-sub-model that outputs a respective metric based on a correlation window between values of a certain type of the raw data element obtained during a first time interval, and values of the certain type of raw data element obtained during at least one second time interval prior to the first time interval. For example, a value indicative of how closely correlated the values within the windows are (e.g., 0 indicates no correlation, 1 indicates complete correlation), and/or a value indicting relationship of the values between the windows, for example, a percentage increase or decrease of the values between the windows (e.g., increase of 30% of the current window relative to the previous window).

In an example where the entity is the company, the ML-sub-model outputs indication of growth of the company computed as a ratio between revenue during a first time interval, and revenue obtained during at least one second time interval prior to the first time interval. The revenue may be computed based on multiple first types of raw data elements, for example, revenue streams such as invoices and/or payments (e.g., validated with bank transactions, accounting systems), which may be obtained from billing and/or accounting systems (e.g., via integration with the systems).

(ii) A ML-sub-model that computes the respective metric when fed values of a defined set of types of raw data elements, for example, using a function and/or other mathematical relationships.

In an example where the entity is the company, the ML-sub-model outputs an indication of customer churn computed based on an input of second types of raw data elements, for example invoices and/or payments and/or data from customer relationship management (CRM) systems. For example, the ML-sub-model may be implemented as a customer Behavioral model which is calculated by processing invoice data to group new customer's interactions (e.g., registration, purchase, etc.) into time periods (i.e., window) for cohorts (e.g., a set of users). For each cohort, the ML-sub-model is computed to reflect the number of returning customers and revenue coming from this cohort and how the revenue changes over time in subsequent windows. The change in the time windows indicates the churn in terms of number of returning customers per cohort, and/or the average life time value of a customer and/or the average and/or marginal life time value in terms of revenue.

In another example where the entity is the company, the ML-sub-model outputs an indication of gross margins computed based on third types of raw data elements. For example, the ML-sub-model may be implemented as a Business oriented model which is calculated from accounting and/or bank data segmented into revenue and/or expenses streams (e.g., sales revenue of organic product, COGS, OPEX, etc). The ML-sub-model may indicate changes in gross margin over time periods (i.e., correlated windows). The Gross Margin may be calculated as the sum of sales revenues minus all the related cogs costs for a window divided by the sales revenue. By using the sub model for revenue prediction and the sub model of cogs/costs prediction, result in a model for predicting the expected future Gross Margin over time.

(iii) A ML-sub-model that computes the respective metric by an aggregation of a combination of outputs of multiple sub-sub-models selected according to a type of the entity. A common set of sub-sub-models may be defined, from which a sub-set is selected according to the type of the entity. Different sub-sets may be selected from different types of entities. The aggregation may be, for example, an average of the values outputted by the members of the sub-set, and/or a function which outputs a value when fed the outputs of the members of the sub-set.

In an example where the entity is the company, the sub-set of sub-sub-models may be selected according to the type of company, such as the structure of the company (e.g., personal proprietor, corporation, non-profile) and/or the business type of the company (e.g., restaurant, high-tech, services). The ML-sub-model may output an indication of unit economics computed as an aggregation of a combination of outputs of the sub-sub-models selected according to a business type of the company.

For example, the ML-sub-model may be implemented as a business oriented model that measures the basic business offer. Unit economics differ between business types (e.g., product oriented business versus asset oriented business that is, selling products to consumers versus renting to the consumers). The unit economic ML-sub-model may be computed for a selected business class (e.g., SaaS, E-Commerce, real estate etc). The ML-sub-model includes multiple sub-sub-models, for example, ARPA, ARPU, CAC over time etc. in order to compute the ML-sub-model that indicates the basic revenue generating units of the company. By assessing the basic unit and the interactions between the sub-sub-models that are included in the generation of the unit economics ML-sub-model, a large set of constrained selected random scenarios (Monte Carlo algorithm) may be simulated (as described herein) which effect the core unit economics of the company evaluated, and/or enable finding the boundaries in which the business model unit economics fail to support the business goals (i.e. growth) and/or may cause the company to default before paying its loan or debt, as described herein.

(iv) A ML-sub-model implemented as a sub-classifier that outputs a probability of the entity to meet the target parameter when fed a selected set of raw data elements. The sub-classifier may be trained on a training dataset that includes, for each of multiple sample entities, sample data elements associated with the respective sample entity, and an indication of meeting a respective target parameter provided to the respective sample entity (e.g., whether the target parameter was met or not).

In an example where the entity is the company, the sub-classifier may output a probability (e.g., percent, or binary value indicating likely or unlikely) indicative of likelihood of the company to raise funds, when the sub-classifier is fed an input of fourth types of raw data elements. The sub-classifier may be trained on a training dataset that includes, for each of multiple sample companies, values of the fourth types of data elements, and an indication of funds raised by the respective company. The sample companies may be companies that are similar to the company entity (e.g., similar size, stage of growth, business type, geographical region) and/or may include companies not necessarily similar to the company entity.

For example, the ML-sub-model may be implemented as an external type model. The fundability ML-sub-model assess the company at hand ability to raise capital. By training a ML-sub-model with input of detailed information about many (e.g., tens of thousands or other values) of other companies, for example, including funding rounds, funding financial institute, who defaulted, IPOs, purchases of the companies, funding to valuation to debt ratio, and other parameters. A ML-sub-model is generated using the training data. The ML-sub-model receives company parameters as input, and outputs the probability of the company to raise funds. The ML-sub-model result may be updated when a new piece of relevant information about the company is obtained (e.g., raw data elements extracted by the code sensors).

(v) A ML-sub-model that outputs risk of failure of one component of multiple components of the entity, on the entity parameter.

In an example where the entity is the company, the ML-sub-model outputs risk of failure of one revenue generating unit of multiple revenue generating units of the company or the company as a whole. The output is generated by the ML-sub-model that computes a statistical distribution of the revenue generating units when fed multiple fifth types of data elements.

For example, the ML-sub-model is based on the Gini index, for example, implemented as a business oriented ML-sub-model that measures the statistical distribution of the company's revenue generating units (e.g. customers, assets at certain location or of different types). The ML-sub-model computes the risk associated with the failure of one revenue generating unit on the entire company, by outputting a value of an index. The higher the value of the index outputted by the ML-sub-model, the lower the probability that a loss of a customer or an asset will lead to a significant effect on the revenues.

(vi) A ML-sub-model that outputs measures and/or prediction parameters based on an analysis of raw data elements indicative of users accessing a web site associated with the entity.

In an example where the entity is the company, the ML-sub-model outputs measures and/or prediction parameters based on an analysis of an input of a sixth type of data elements indicative of users accessing a web site associated with the company (e.g., site analytics). For example, a web site that provides online purchases of products provided by the company, and/or a web site that explains products and/or services provided by the company.

In another example where the entity is the company, the ML-sub-model outputs measures and/or prediction parameters based on an analysis of a seventh type of data seventh type of data elements indicative of users interacting with presented advertisements (e.g., data analytics).

For example, the ML-sub-model may compute web site analytics for the web site of the company. The ML-sub-model may be implemented as a customer behavioral model. The following is an example of a set of measures and/or prediction of customer behavior based on the site analytics:

Marketing CAC—A ML-sub-model is computed for predicting influence of marketing budget on traffic of new customers to the company site. CAC is calculated by dividing the online advertising marketing budget with the number of new unique customers at the web site normalized by the sum of segmented target audience of each marketing channel (e.g., advertising on search engine results, advertising on social networks, postings on social network pages). Using the previously mentioned points obtained sequentially over a time interval, a future CAC may be predicted by the ML-sub-model in response to an input of marketing budgets (company P&L), CAC and/or audience exhaustion.

Revenues stability—by analyzing the number of new unique daily users arriving to the company web site and/or by tracking web site activities of the new unique daily users, for example, bounce rates, revisits, time on site, page views, conversion rates, life time value, geographies, device types, which are adjusted with the cost associated with acquiring a customer (CAC), a ML-sub-model of revenue stability over time is computed. The ML-sub-model computes the influence of CAC on the revenue, which may detect the state of the company in terms of ability to grow. Conceptually, the output of the ML-sub-model provides an indication of an understanding of whether the company has room to grow within its current market and/or at which CAC levels and/or whether the company has already exhausting its growth.

(vii) A ML-sub-model that outputs an indication of users within the entity based on an analysis of profiles of the users posted on social networks hosted by external social network servers.

(viii) An ML-sub-model that outputs measures and/or prediction parameters based on an analysis of marketing elements indicative of users interacting with ads and/or promotions associated with the entity.

In an example where the entity is the company, the ML-sub-model outputs an indication of employee replacement within the company based on an analysis of employee profiles posted on social networks hosted by external social network servers. For example, the ML-sub-model may compute a rate of Company Employee job replacement. The ML-sub-model may be implemented as an external type model. By finding and tracking company employee profiles (e.g., posted on social networks) and/or monitoring the number of employees switching jobs and/or the average time it took the employees to find a new job, inner company changes that could suggest something bad is happening to the company may be detected. For example, the company is reducing its employee pool in order to cut costs, and/or people are leaving since they sense the company is in a bad shape. Either one is a negative sign, especially when the people who left the company are talented people who find a new job quickly.

(ix) Another example relates to ERP systems, from which the sensor collects, for example, one or more of: purchase orders, long term contracts and/or commitments, changes in supplies, and the like. The extracted data is used to compute a ML-sub-model that outputs an indication of one or more of: real time short and/or long term costs predictions, detected expected significant cost changes due to external contractor contracts, changes in supplied services prices, bill of materials (BOM), and ongoing purchase orders.

At 104, a principal ML model is provided and/or trained. The principal ML model outputs a value of an entity parameter corresponding to the target parameter in response to an input of the sub-values outputted by the ML-sub-models.

The principal ML model may be trained (e.g., using a supervised and/or unsupervised approach) using a training dataset that including for each of multiple sample entities, the sub-values and corresponding entity parameters (e.g., the entity parameter serves as a ground truth label for the respective sub-values). The training dataset may be created by obtaining raw data elements for each of the sample entities (e.g., as described with reference to 106), inputting the raw data elements for each respective sample entity into the ML-sub-models (e.g., as described with reference to 108) to obtain corresponding sub-values. The set of sub-values is labelled with a ground truth label of the entity parameter corresponding to the respective entity, obtained, for example, from available sources. For example, in the case of companies looking for funding, the entity parameter may be the ability of the company to pay back the loan and/or financial assets of the company indicating ability to pay back the loan, which may be obtained from sources such as annual reports, and/or public fundraising events by the company.

The principal ML model may be implemented as, and/or may include, a function of a multiple parameters associated with the sub-values outputted by the ML-sub-models. The function may be included and/or be implemented as one or more of: a set of rules, neural networks of various architectures (e.g., artificial, deep, convolutional, fully connected), Markov chains, support vector machine (SVM), logistic regression, k-nearest neighbor, decision trees, field aware factorization machine (FFM), singular spectrum analysis (SSA) and combinations of the aforementioned.

The parameters may be associated with respective weights. The principal ML model may be trained by learning the weights. The weights of the function may be computed based on automated combinatorial variance scenarios that impact the entity parameter. For example, the function may be a regression function, where weights are learned. In another example, the function may be a neural network, where weights of neurons are learned.

The number of weights may be extremely large, for example, when most or all of relevant combinations between raw data elements and sub-values are evaluated. The weights may be learned by evaluating, for example, causations, inner interactions, cross influence, inner influence, and/or combination of the aforementioned.

At 106, raw data elements associated with an entity are received from data sources of multiple network nodes. Optionally, raw data elements are extracted per entity. Examples of data elements include one or more of: structured data obtained from structured data source storing data of the entity, numerical data obtained from data sources computing the numerical data for the entity, and unstructured data obtained from open source and/or social networks.

Optionally, the raw data elements are extracted, for example, by code sensors installed on the network nodes, code that searches for relevant data across the network such as a crawling program that crawls the network using web links. The raw data elements may be received via API and/or SDK. The code sensors may be designed to monitor the data source for new raw data elements associated with the entity, and extract the raw data elements. Extraction of data elements may be customized per entity, where optionally code sensors are designed and/or selected per entity. The code sensors may be designed according to the type of data source, for example, for extraction of structured raw data elements from structured data sources (e.g., monitoring a value in a field for changes to the value), for extraction of unstructured raw data elements from unstructured data sources (e.g., monitoring a social network for new posts, analyzing the new post to identify raw data elements, and extracting the raw data elements from the new post), and/or for extraction of numerical data elements from data sources that compute the numerical data.

The raw data elements may be extracted in real time (i.e., near real time) and/or may be injected into a server in real time (i.e., near real time). The term real time and/or near real time may refer to a short period of time, that may include delays in transport of data, for example, network delays due to network congestion. Examples of near real time include, for example, less than 1, 10, 30, 60, 120, 180 seconds, or less than 1, 6, 12, 24 hours, or other values.

The raw data elements may be injected into the server, for example, via an API and/or SDK.

It is noted that the raw data elements may include anomalies, and/or that some raw data elements are missing (entirely and/or occasionally). Such raw data elements, when used as described herein, represent an increased risk of the entity failing to meet the target parameter.

In an example, the entity comprises a company. The term company may refer to one or more of: a registered business, a private individual running a business, a corporation, a non-profile organization, and a government related organization. For the company, the following raw data elements associated with the company may be extracted: data elements indicative of customers of the company, data elements indicative of financial details of the company, and data elements obtained from third party sources related to the company. Exemplary data sources from which the raw data element may be extracted include: a web server hosting a web site or web application of the company, online articles hosted by news sites discussing the company, and social networks and/or other servers where employees and/or customers of the company post content such as reviews and/or ratings. Other exemplary data sources include: bank accounts, invoicing and billing systems, web analytics reports, human resource (HR) management systems, customer relationship management (CRM) and enterprise resource planning (ERP) systems.

In the example where the entity is a company, the raw data elements may be classified into three types of data: Customer Behavioral data (e.g., extracted from site analytics, CRM systems, churn analysis, and the like), Business Oriented data (e.g., extracted from accounting and/or billing systems, bank transactions, ERP systems, and the like), and Open sources (e.g., extracted from third party sources related to the company at interest such as professional social networks, websites evaluating the company, and websites describing funding of the company).

In the example where the entity is a company, the target parameter described herein, which may be defined in a request, may include monetary funds indicated in a funding request for financing the company. The entity parameter described herein may include financial assets of the entity used to pay back the funds of the loan request.

At 108, the raw data elements associated with the entity are inputted into the ML-sub-models to obtain an output of respective sub-values, for example, metrics and/or prediction parameters. The ML-sub-models may be implemented by hardware processors(s) of the server which receives the raw data elements.

Optionally, different raw data elements are directed into one or more ML-sub-models, according to the input designation of the respective ML-sub-model. Each raw data element may be fed into one or mode ML-sub-models. The raw data elements may be fed into corresponding ML-sub-model(s), for example, based on a tag (e.g., metadata) associated with the raw data element that defines the type of the raw data element (e.g., structured, unstructured, numerical) and/or the source of the raw data element and/or the destination for the raw data element. In another example, virtual channels and/or tunnels may be set up for streaming the raw elements from their source to corresponding ML-sub-model(s).

At 110, adjusted sub-values are generated by applying computed simulated adjustments to the obtained sub-values.

Optionally, the simulated adjustments are computed based on a Monte-Carlo simulation model and a set of prior distribution, given and/or calculated from the raw data.

Optionally, feature 172 of FIG. 1B is implemented before and/or after and/or in parallel to feature 110. Feature 172 of FIG. 1B may be implemented to identify the most influential raw data elements that have greatest impact on the entity parameter. The simulated adjustments may be made to the sub-values outputted by the ML-sub-models which receive an input of the identified most influential raw data elements. Alternatively or additionally, the adjustments are made to all of the sub-values, or a subset of the sub-values.

Referring now back to 110 of FIG. 1A, distribution used for computing the simulated adjustments may be, for example, possible ranges of values of the raw data elements and/or sub-values, historical variation in values of the raw data elements and/or sub-values (e.g., historical analysis of different values and/or fluctuation of values of the raw data elements and/or sub-values) and/or predictions of possible future values of the raw data elements and/or sub-values (e.g., performed manually by an expert and/or predicted by a trained sub-machine learning model) and/or fitting raw data with a set of general distributions (e.g. Normal, Beta, Uniform, Exponential, Chi-Square etc). Adjustments may be made by random selection of the raw data elements and/or the sub-values from a statistical distribution of possible values for the raw data elements and/or the sub-value, for example, a normal distribution, a geometric distribution, a bimodal distribution, and/or other statistical distributions. The distribution may be based on estimated values and/or historical values. Alternatively or additionally, the adjustment to the raw data elements and/or the sub-values is selected from the statistical distribution. The selected adjustment is applied to the respective raw data element(s) and/or the sub-value(s).

Examples of adjustments include: an increase in the raw data element and/or sub-values, a decrease in the raw data element and/or sub-values, a change in type of the raw data element and/or sub-values, and appearance of a new type of the raw data element and/or sub-values.

At 112, the adjusted sub-values are inputted into the principal ML model.

At 114, an outcome of the principal ML model is obtained. The outcome of the principal ML model is a simulated value for the entity parameter, based on the set of adjusted sub-values.

The process of simulating adjustments to the sub-values and obtaining corresponding simulated values for the entity parameter may sometimes be referred to as a stress test.

At 116, features described with reference to 110-114 are iterated for generating multiple simulated values for the entity parameter. During each iteration, another set of adjusted sub-values are generated by applying another set of simulated adjustments to the sub-values. Each set of adjusted sub-values is inputted into the principal ML model to obtain a respective simulated value for the entity parameter. The multiple iterations generate a set of simulated values for the entity parameter. Conceptually, the multiple simulated values of the entity parameter representing a set of possible predicted values for the entity parameter of the entity that may occur.

At 118, a risk classifier is generated according to an analysis of the set of simulated values computed for the entity parameter and/or as a mathematical formula and/or ML classifier. The risk classifies generates a likelihood of the entity failing to meet the target parameter. For example, when the entity is a company, the likelihood of the company failing to meet the full loan obligation (i.e., unable to pay back the full loan amount). The likelihood of the company failing to meet the full loan obligation may be determined when the financial assets of the company are predicted to be less than the full amount of the loan.

Optionally, a threshold denoting risk of the entity failing to meet the target parameter, is received, for example, manually entered by a user, stored as a preset value in a memory, and/or automatically computed by code (e.g., as an optimization). The analysis may refer to computing the likelihood by using the risk classifier that receives the set of computed simulated values for the entity parameter and outputs an entity score. In one example, the risk classifier is implemented as an over-under percentage classifier that evaluates the simulated values above (or below) a set threshold relative to the whole set of simulate values to compute the entity score, for example, as described with reference to FIG. 4. Optionally, likelihood of the entity meeting the target parameter is determined when the entity score is above the target parameter.

The risk classifier may be implemented, for example, a set of rules, neural networks of various architectures (e.g., artificial, deep, convolutional, fully connected), Markov chains, support vector machine (SVM), logistic regression, k-nearest neighbor, decision trees, and combinations of the aforementioned.

At 120, the ML features described with reference to one or more of 102-118, for example, 106-118, may be iterated. The iterations may be performed for generating updated ML-sub-models, updated principal ML model, and/or updated risk classifier, as new raw data is available. The iterations may be triggered, for example, when new raw data becomes available, and/or by events (e.g., every day, week, month), and/or based on a set of rule (e.g., when new raw data is statistically significantly different than historical raw data), and/or when changes in one or more monitored raw data elements are detected, for example, change in the value thereof, new data elements, and/or removal of previous data elements. For example, the data sources are scanned by the code sensors (e.g., in near real time) to detect changes to the raw data elements. When a change is detected the iteration may be triggered.

At 122, the ML model ensemble is provided, for example, stored in a data storage device, forwarded to another server, and/or provided for use by another process. The ML model ensemble includes the ML-sub-models, the principal ML model, and the risk classifier. The ML model ensemble may be customized in the sense that the ML model ensemble is created for the certain entity (e.g., company) to be used for the certain entity as it is based on a set of ML-sub-models for the certain entity. The customized ML model ensemble may not be relevant to other entities, for which a respective customized ML model ensemble may be created.

The ML model ensemble is used for outputting a predicted value for the entity parameter in response to being fed input raw data elements, for example, as described with reference to FIG. 1B.

The ML model ensemble may be provided, for example, centrally stored by the server for centrally computing the entity parameter when fed raw data elements. In another example, the customized ML model may be provided to a client terminal (e.g., smartphone, desktop computer) for local storage and/or execution, for local computation of the entity parameter when fed raw data elements.

Referring now back to FIG. 1B, at 152, a request may be received. The request is received from an entity. The request is to obtain a target parameter. The request may be received, for example, via a user interface such as a graphical user interface (GUI). The request may be entered manually and/or automatically.

In the example described herein, the entity is a company, for example, a sole proprietor, start-up, corporation, and/or other business related organization. In such a case, the request may be for an amount of funding, optionally up to an amount of pre-approved funding (e.g., presented in the GUI). The amount of pre-approved funding may be dynamically computed and dynamically updated, as described herein.

The company may set up a user account with which to request funds (e.g., a loan), and/or is recognized by a funding service for requesting funds. The target parameter relates to monetary funds indicated in a funding request for financing the company. The funding request may be submitted, for example, via a user interface of the user account, and/or may be submitted to the funding service. The entity parameter indicates the ability of the company to pay back the funds, for example, based on current financial assets and/or predicted future financial assets.

Features described with reference to FIG. 1A may be triggered in response to receiving the request. Alternatively, initially features described with reference to FIG. 1A may be triggered in response to the entity itself, prior to the request. For example, the entity sets up a user account, and/or the entity is recognized. Optionally, the ML model ensemble is computed in response to receiving the request. The request for the target parameter may be received, for example, prior to and/or in parallel to implementation of the features described with reference to FIG. 1A. The request may be received, for example, via the user account of the entity.

Optionally, in an initial stage, one or more features 154-168 are implemented as an initial evaluation of the entity parameter. The requested target parameter may be provided, or a value corresponding to the entity parameter may be provided, as described herein. In the example, the company requests funding. The company's ability to pay back the funds is evaluated as described herein. The full value of the funding may be provided when the company is determined as being able to pay back the full amount, or a partial value of the funding may be provided according to the determined ability of the company to pay back the funds when the company is predicted to be unable to pay back the full amount. In one or more second stages, following the feature described with reference to 170A-B, one or more features 152-178 are implemented, as an ongoing monitoring of the entity parameter. In the example, a monitoring of the ability of the company to pay back the funds. When the company improves, and the ML model ensemble predicts that the company is able to pay back more than the requested funds, addition funding may be automatically granted upon request. Alternatively, when the company's ability to pay back the full amount of the funding requested (or the amount provided) decreases, the company's request for automated additional funding is declined (or required manual intervention for approval).

At 154, raw data elements are received, for example, as described with reference to 106 of FIG. 1A. The raw data elements may be extracted by code sensors installed on network nodes and injected into the server in real time.

Optionally, the raw data elements are new raw data elements that were not used to create the ML model ensemble. Alternatively or additionally, the new raw data elements are used to update the ML model ensemble, as described with reference to 120 of FIG. 1A.

At 156, the raw data elements are inputted into the trained ML-sub-models, for example, as described with reference to 108 of FIG. 1A.

Optionally, the raw data elements are sequentially fed into the ML-sub-models. Raw data elements may be dynamically extracted and streamed into the ML-sub-model. In another example, a set of raw data elements is first collected, for example, over a time interval, and then the set is fed into the set of ML-sub-models. The set of raw data elements may be sequentially obtained over sequential time intervals, for example, once an hour, once a day, or once a week.

At 158, sub-values are obtained as an outcome of trained ML-sub-models, for example, as described with reference to 108 of FIG. 1A.

At 160, adjusted sub-values are generated by applying simulated adjustments to the obtained sub-values, for example, as described with reference to 110 of FIG. 1A.

At 162, the adjusted sub-values are inputted into the trained principal ML model, for example, as described with reference to 112 of FIG. 1A.

At 164, a simulated value for the entity parameter is obtaining as an outcome of the principal ML model, for example, as described with reference to 114 of FIG. 1A.

At 166, features described with reference to 160-164 are iterated to obtain multiple simulated values for the entity parameter, for example, as described with reference to 116 of FIG. 1A.

At 168, the multiple simulated values are inputted into the risk classifier that computes a likelihood of the entity failing to meet the target parameter, for example, as described with reference to 118 of FIG. 1A.

At 170A, in response to the likelihood of the entity failing to meet the target parameter being below a threshold (e.g., the threshold as described with reference to 118 of FIG. 1A), the target parameter may be provided to the entity (i.e., according the request), optionally automatically provided. For example, the amount of funding is automatically deposited to an account of the company.

Alternatively, at 170B, in response to the likelihood of the entity failing to meet the target parameter being above the threshold, the request for the target parameter may be denied, optionally automatically denied.

For example, for the case of the entity being a company, the predicted value for the entity parameter includes financial assets of the entity. The target parameter includes monetary funds requested in a loan. The risk of the company failing to meet the loan obligation (i.e., company unable to pay back its loan) is determined when the financial assets of the company are predicted by the ML model to be less than the requested loan funds.

Optionally, in such a case, the risk classifier may be used to evaluate a value for target parameter the entity is likely to meet. The entity may be provided the evaluate value for the target parameter, which is lower than the requested target parameter. For example, when the company is predicted as unable to meet the full loan obligation, the amount of loan that is provided to the company may be determined according to the predicted amount that the company is likely to meet (e.g., predicted financial assets of the company). The amount of loan provided to the company may be according to the predicted ability of the company to pay back, rather than the full requested amount.

At 172, a trend may be computed according to the iteratively computed updated likelihood of the entity parameter failing to meet the target parameter, for example, sequential outputs of the risk classifier.

Optionally, the trend is extrapolated to a future time for predicting when the likelihood of the entity failing to meet the target parameter is above the threshold or below the threshold. The trend may be analyzed, for example, to predict when companies that are currently likely to pay back the loan will become unable to pay back the loan, and/or when companies that are currently unlikely to pay back requested loans will be able to pay back the requested loan. Such companies may be monitored, for example, to recall loans, and/or to offer larger loans.

Optionally, an alert is generated according to the trend. For example, when the company is predicted as being unable to pay back the loan in the future based on the trend. The alert may be, for example, a message in the GUI, a pop-up message on a screen, an email, a phone call, and/or a message sent to a mobile device.

At 174, the weights of the function of the principal ML model may be analyzed to identify influencing weights that most influence values of the entity parameter. A set of sub-functions may be computed, where, each sub-function corresponds to a certain influencing weight for correlating between raw data element(s) and value of the entity parameters.

The identified most influential raw data elements may be monitored as predictors of likelihood of changes to the entity parameter. Changes in the influential raw data elements may trigger a re-computation of the risk, for example, by iterating 154-168.

At 176, an interactive graphical user interface (GUI) presented on a display of a client terminal may be dynamically updated.

The GUI may be dynamically updated with an indication of the risk computed by the risk classifier, for example, indicative of an amount of pre-approved funding available for the company which the company is likely to be able to pay back, for example, determined based on dynamically computed likelihood of obtaining sufficient financial assets to pay back the pre-approved funding.

The GUI be dynamically updated in response to triggered iterations, for example, as described with reference to 178.

In the case of the entity being the company, the GUI may be updated to present an indication of amount of pre-approved funding available for the company. The amount of pre-approved funding may be determined based on the dynamically computed likelihood of obtaining sufficient financial assets to pay back the pre-approved funding outputted by the ML model ensemble. The GUI may present a real time pre-approval of funding based on real time raw data elements.

Optionally, the request (e.g., as described with reference to 152) for an amount of funding up to the amount of pre-approved funding presented in the GUI is received, for example, via the GUI. The amount of requested pre-approved funding may be automatically deposited into an account of the company, as described with reference to 170A.

Optionally, an alert is generated in the user interface when the predicted likelihood of the entity failing to meet the target parameter has changed. The alert may be generated during iterative monitoring of the output of the risk classifier, for example as described with reference to 178. For example, the predicted likelihood increases above the threshold. In the example, the ability of the company to pay back the full amount of the loan (due to predicted financial assets being above the value of the loan) has changed, and the company is currently predicted to be unable to pay back the full amount of the loan (due to predicted financial assets being below the value of the loan). In such a case, one or more automated and/or manual actions may be triggered. For example, the company is requested to return a part of the loan corresponding to the future ability to pay, and/or the company is automatically denied additional funding requests.

At 178, one or more features described with reference to 152-176 are iterated.

The iterations may be performed, for example, in response to new requests for the target parameter by the entity.

The iterations may be performed to dynamically re-compute the risk (e.g., as in 168) in response to changes in the raw data elements. Optionally, a change in statistics of one or more of the raw data elements is monitored (e.g., by the code sensors), for example, a statistically significant change. The iterations may be triggered in response to the detected statistically significant change, i.e., inputting the changed values of the raw data elements into the trained ML-sub-model as in 156.

The iterations may be performed to dynamically re-compute the risk, for example per time interval, such as once a day, once a week, once a month, once a quarter, or once a year.

Optionally, the iterations are performed as follows: At 154, updates of the raw data elements are iteratively obtained. At 156, the updates of the raw data elements are inputted into the ML-sub-models. At 158, updated respective sub-values are obtained. At 160, simulated adjustments are applied to the updated sub-values to obtain adjusted updated sub-values. At 162, the adjusted updated sub-values are inputted into the principal ML model. At 164, simulated updated values for the entity parameter are obtained as an outcome of the principal ML model. At 166, 160-164 are iterated to obtain multiple simulated updated values for the entity parameter. At 168, the simulated updated values are inputted into the risk classifier for generating an updated likelihood of the entity failing to meet the target parameter (e.g., according to the analysis of the simulated updated values for the entity parameter.)

Figure 3:
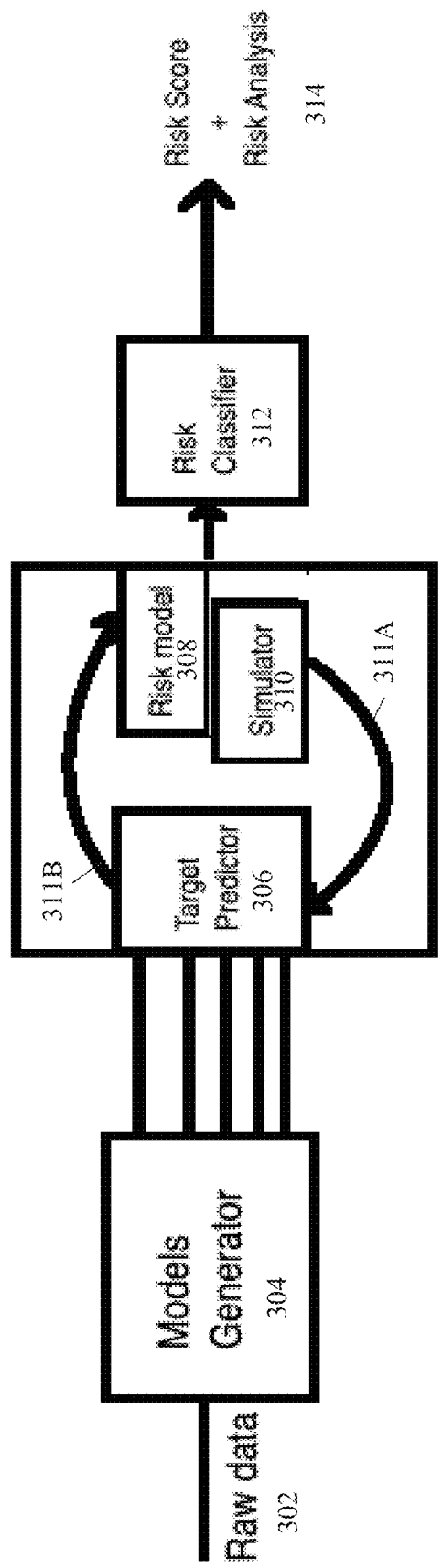
FIG. 3 is a dataflow diagram depicting an exemplary dataflow for generating an ML model ensemble for computing likelihood of an entity failing to meet a target parameter, in accordance with some embodiments of the present invention.

Optionally, the iteration is triggered in response to a new request, for example, an increase of, and/or additional target parameter, for example, the company requesting additional funding. Reference is now made to FIG. 3, which is a dataflow diagram depicting an exemplary dataflow for generating an ML model ensemble for computing likelihood of an entity failing to meet a target parameter, in accordance with some embodiments of the present invention. One or more of features of the dataflow diagram described with reference to FIG. 3 may correspond to the features of the method described with reference to FIG. 1A, for example, as described herein. The dataflow described with reference to FIG. 3 may be implemented by one or more components of the system described with reference to FIG. 2.

At 302, raw data elements associated with an entity are received from data sources of multiple network nodes (also referred to as "raw data" in FIG. 3), for example, as described with reference to 106 of FIG. 1A.

At 304, the raw data elements are fed into sub-(also referred to as "models generator" in FIG. 3), for example, as described with reference to 108 of FIG. 1A. It is noted that the ML-sub-models may be trained as described with reference to 102 of FIG. 1A.

At 306, sub-values are obtained as an outcome of the ML-sub-models, for example, as described with reference to 108 of FIG. 1A. The sub-values may also referred to as "target predictor".

At 308, the sub-values are inputted into the principal ML model (also referred to as "risk model" in FIG. 3), for example, as described with reference to 112 of FIG. 1A.

The risk model may be a machine learning model and/or mathematical model, for example, a function, that maps a combination of the sub-values outputted by the ML-sub-models to the entity parameter. For example, the risk model is based on a "profit=revenue−cost" conceptual model, where profit corresponds to the entity parameter, and revenue and cost correspond to the sub-values outputted by the ML-sub-models when fed the raw elements and/or adjustments to the raw data elements.

At 310, simulated adjustments to the sub-values are computed, for example, by simulator code, such as a Monte-Carlo simulation model and a distribution, for example, as described with reference to 110 of FIG. 1A.

At 311A and 311B, features described with reference to 306, 308, and 310 may be iterated, for generating multiple simulated values for the entity parameter, for example, as described with reference to 116 of FIG. 1A.

At 312, a risk classifier is generated using the set of simulated values computed for the entity parameter, for example, as described with reference to 118 of FIG. 1A.

At 314, the risk classifier generates a likelihood of the entity failing to meet the target parameter (also referred to herein as "risk score+risk analysis"), for example, as described with reference to 118 of FIG. 1A. The term risk score may be interchanged with the term entity score.

The ML model ensemble, which includes the ML-sub-models, the principal ML model, and the risk classifier, is provided for computing likelihood of the entity failing to meet a target parameter which may be received in a request, as described herein, for example, as described with reference to FIG. 1B.

Figure 4:
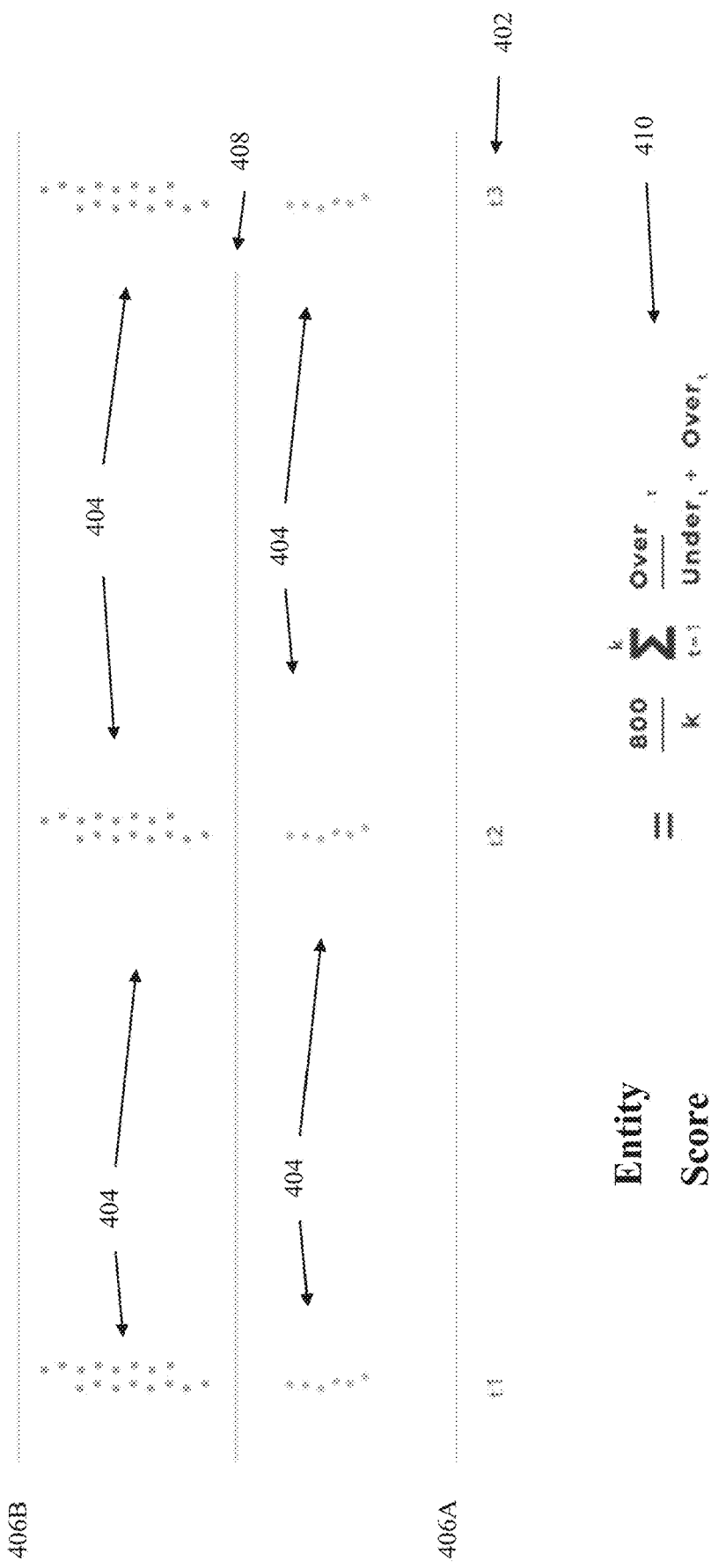
FIG. 4 is a schematic depicting results of a stress test process used to generate the risk classifier, in accordance with some embodiments of the present invention.

Reference is now made to FIG. 4, which is a schematic depicting results of a stress test process (in which adjusted sub-values are created and inputted into the principal ML model to obtain simulated values for the entity parameter) used to generate the risk classifier, in accordance with some embodiments of the present invention. The stress test corresponds, for example, to features 110, 112, 114, and 116 described with reference to FIG. 1A, and/or to features 160, 162, 164, and 166 described with reference to FIG. 1B.

The stress test is performed using raw data elements obtained at three time intervals, denoted t1, t2, and t3 depicted along a time axis 402. At each time interval, multiple simulated values for the entity parameter 404 are computed. Simulates values 404 are obtained by adjusting sub-values (which were obtained by inputting the raw data elements into the ML-sub-models), and inputting the sub-values into the principal ML model. The simulated values are obtained as an outcome of the principal ML model, as described herein.

The risk classifier may compute an entity score according to an analysis of simulated values 404. The entity score may be indicative of likelihood of the entity failing to meet the target parameter. The simulated values of the entity parameters 404 may be normalized to within a defined scale 406A-B, for example, within a range of 0-800, or 0-100, or other values. The entity score may be computed relative to a threshold 408 set within the scale. The threshold 408 may represent a likelihood of whether the target parameter is likely to be met by the entity based on the entity parameter, independent of the actual value of the target parameter, and/or without knowing what the target parameter actually is. For example, for the example in which the entity is a company, when the computed entity parameters represent available cash, and threshold 408 represents 3 times operating expenses, when available cash is below the threshold, the company is unlikely to be able to pay back the loan regardless of the amount of the loan (i.e., no spare cash left). When available cash is above the threshold, the company is likely to be able to pay back the loan (i.e., enough cash to cover operating expenses and enough extra cash available). The entity score may be computed using equation 410, which is computed from the multiple simulated entity parameters 404, and indicative of likelihood of whether the entity parameter will fall above or below threshold 408.

The generated risk classifier, which may output the entity score in response to an input of simulated values 404, may include equation 410 and threshold 408.

The entity score may be computed independently of other values described herein. The entity score may be presented on a display within the GUI.

Figure 5:
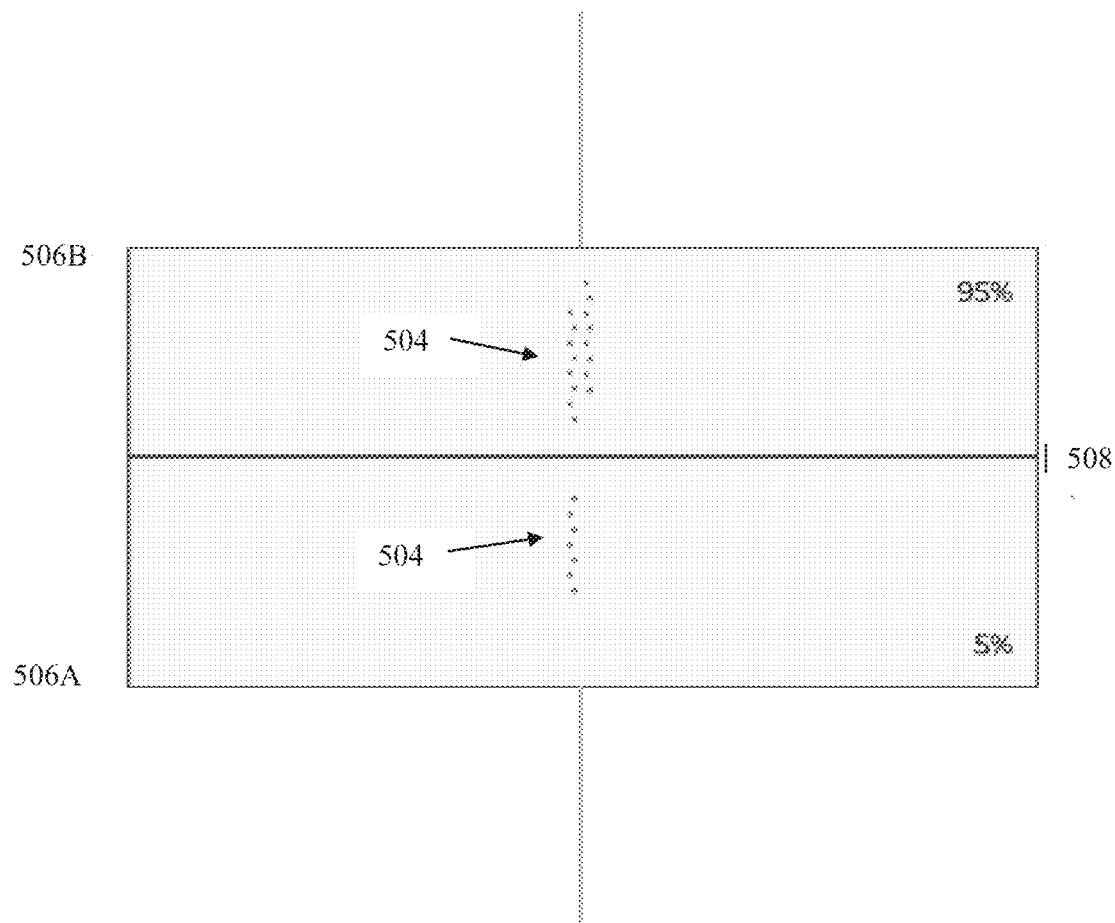
FIG. 5 is a schematic depicting a process for setting a threshold for determining whether an entity score of a certain entity represents likelihood of the entity failing to meet the target parameter, in accordance with some embodiments of the present invention.

Reference is now made to FIG. 5, which is a schematic depicting a process for setting a threshold 508 for determining whether an entity score of a certain entity represents likelihood of the entity failing to meet the target parameter, in accordance with some embodiments of the present invention. Entity scores 504 computed for multiple entities (as described with reference to FIG. 1B and/or FIG. 4) are obtained. Each entity score 504 is computed for another entity, for example, by iterating the features described with reference to FIG. 1B and/or FIG. 4 for each respective entity. Entity scores 504 fall within a range 506A-B (e.g., 0-800, 0-100, or other), and/or may be normalized to fall within range 506A-B. Threshold 508 may be set according to the distribution of the entity scores, for example, the lowest 5% of entity scores are located below threshold 508, and the highest 95% are located above threshold 508. Other threshold may be used, for example, 25/75%, 50/50%, or other.

The respective entity score 504 computed for each entity may be evaluated relative to other entity scores of other entities, to determine whether the respective entity score falls above or below threshold 508. For example, the state of the entity score for the respective entity versus the entity scores for other entities may be analyzed and/or presented in the GUI. For example, when the respective entity score 504 is below the threshold 508, the entity corresponding to the respective entity score 504 may be determined as likely failing to meet the target parameter, and when the respective entity is above the threshold, the entity may be determined as likely to meet the target parameter.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant ML model will be developed and the scope of the term ML model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of generating a machine learning (ML) model ensemble for computing likelihood of an entity failing to meet a target parameter, comprising:

training a plurality of ML-sub-models that each respectively output sub-values in response to an input of raw data elements;

training a principal ML model that outputs a value of an entity parameter corresponding to the target parameter in response to an input of the plurality of sub-values outputted by the plurality of ML-sub-models, using a training dataset including for each of a plurality of sample entities, the plurality of ML-sub-values and corresponding entity parameters;

inputting a plurality of raw data elements associated with the entity into the plurality of ML-sub-models to obtain an output of respective sub-values;

in a plurality of iterations:
    computing, based on a probabilistic simulation model and a set of prior distribution, given or calculated from the raw data elements, a plurality of simulated adjustments for the plurality of obtained sub-values outputted by the plurality of ML-sub-models;
    applying the respective plurality of simulated adjustments to the plurality of obtained sub-values outputted by the plurality of ML-sub-models to generate a plurality of adjusted sub-values for the plurality of obtained sub-values;
    inputting the plurality of adjusted sub-values for the plurality of obtained sub-values computed by applying the plurality of simulated adjustments to the outputs of the plurality of ML-sub-models, into the principal ML model;
    obtaining from the principal ML model in the plurality of iterations, a plurality of simulated values for the entity parameter in response to the inputting of the plurality of adjusted sub-values for the plurality of obtained sub-values computed by applying the plurality of simulated adjustments to the outputs of the plurality of ML-sub-models; and generating a risk classifier that generates a likelihood of the entity failing to meet the target parameter according to an analysis of the plurality of simulated values for the entity parameter outputted by the principal ML model in the plurality of iterations in response to the inputting of the plurality of adjusted sub-values for the plurality of obtained sub-values computed by applying the respective plurality of simulated adjustments to sub-values outputted by the plurality of ML-sub-model, wherein the risk classifier is generated based on a few shot or single shot training approach using the plurality of raw data elements as initial input, by generating additional synthesized data for generating the risk classifier by computing and using the plurality of simulated values for the entity parameter outputted by the principal ML model in the plurality of iterations in response to the inputting of the plurality of adjusted sub-values for the plurality of obtained sub-values computed by applying the respective plurality of simulated adjustments to the plurality of ML-sub-models inputted with the plurality of raw data elements.

2. The method of claim 1, further comprising:
iteratively obtaining updates of the plurality of raw data elements;
   iteratively inputting the updates of the plurality of raw data elements into the plurality of ML-sub-models to obtain updated respective sub-values;
   in a plurality of updated iterations:
      computing the plurality of simulated adjustments to the plurality of updated respective sub-values to obtain a plurality of adjusted updated sub-values;
      inputting the plurality of adjusted updated sub-values into the principal ML model;
      obtaining a plurality of simulated updated values for the entity parameter; and
      generating an update of the risk classifier using an updated analysis of the plurality of simulated updated values, for generating an updated likelihood of the entity failing to meet the target parameter.

3. The method of claim 1 wherein the principal ML model includes a function of a plurality of parameters associated with the plurality of sub-values outputted by the plurality of ML-sub-models, the plurality of parameters associated with a plurality of weights, and training the principal ML model comprises learning the plurality of weights.

4. The method of claim 3, wherein the plurality of weights of the function are computed based on automated combinatorial variance scenarios that impact the entity parameter.

5. The method of claim 4, further comprising:
analyzing the plurality of weights of the function to identify a plurality of influencing weights that most influence values of the entity parameter, and
computing, a set of sub-functions, each sub-function corresponding to a certain influencing weight for correlating between at least one raw data element and value of the entity parameters.

6. The method of claim 1, further comprising receiving a threshold denoting risk of the entity failing to meet the target parameter, and wherein the analysis comprises computing the likelihood by computing an entity score based on the simulated values above or under the threshold relative to a whole set of simulated values.

7. The method of claim 6, further comprising:
determining a likelihood of the entity meeting the target parameter when the entity score is above the target parameter.

8. The method of claim 1, wherein the plurality of raw data elements associated with the entity are selected from the group consisting of: structured data obtained from structured data source storing data of the entity, numerical data obtained from data sources computing the numerical data for the entity, and unstructured data obtained from open source and/or social networks.

9. The method of claim 1, wherein at least one of the plurality of ML-sub-models is selected from the group consisting of:
(i) outputs a respective metric based on a correlation window between values of a certain type of the raw data element obtained during a first time interval, and values of the certain type of raw data element obtained during at least one second time interval prior to the first time interval,
(ii) computes a respective metric when fed values of a defined set of types of raw data elements,
(iii) computes a respective metric by an aggregation of a combination of a plurality of sub-sub-models selected according to a type of the entity,
(iv) a sub-classifier that outputs a probability of the entity to meet the target parameter when fed a selected set of raw data elements, the sub-classifier trained on a training dataset that includes, for each of a plurality of sample entities, sample data elements associated with the respective sample entity, and an indication of meeting a respective target parameter provided to the respective sample entity,
(v) outputs risk of failure of one component of a plurality of components of the entity on the entity parameter,
(vi) outputs measures and/or prediction parameters based on an analysis of raw data elements indicative of users accessing a web site associated with the entity,
(vii) outputs an indication of users within the entity based on an analysis of profiles of the users posted on social networks hosted by external social network servers, and
(viii) outputs measures and/or prediction parameters based on an analysis of marketing elements indicative of users interacting with ads and/or promotions associated with the entity.

10. The method of claim 1, wherein the plurality of simulated adjustments are computed based on the probabilistic simulation model comprising a Monte-Carlo simulation model and the set of prior distribution, given or calculated from the raw data.

11. The method of claim 1, wherein the features of the method are implemented by at least one hardware processor executing on a server, wherein the raw data elements are extracted by code sensors installed on a plurality of network nodes and injected into the server in real time.

12. The method of claim 1, wherein the entity comprises a company, wherein the target parameter defined in a request comprises funds defined in a funding request for financing the company, and the entity parameter comprises financial assets of the entity used to pay back the funds of the funding request.

13. The method of claim 12, wherein the plurality of raw data elements associated with the entity are selected from the group consisting of: data elements indicative of customers of the company, data elements indicative of financial details of the company, and data elements obtained from third party sources related to the company.

14. The method of claim 12, wherein at least one of the plurality of ML-sub-models outputs a respective metric and/or prediction parameter selected from the group consisting of:
(i) indication of growth of the company computed as a ratio between revenue during a first time interval, and revenue obtained during at least one second time interval prior to the first time interval, wherein the revenue is computed based on a plurality of first types of raw data elements including invoices and/or payments obtained from billing and/or accounting system integration,
(ii) indication of customer churn computed based on a plurality of second types of raw data elements including invoices and/or payments and/or data obtained from customer relationship management (CRM) systems, (iii) indication of gross margins computed based on a plurality of third types of raw data elements, (iv) indication of unit economics computed as an aggregation of a combination of a plurality of sub-sub-models selected according to a business type of the company, (v) a sub-classifier that outputs probability of the company to raise funds when fed a plurality of fourth types of raw data elements, the sub-classifier trained on a training dataset that includes, for each of a plurality of sample companies, values of the fourth types of data elements, and an indication of funds raised by the respective company, (vi) outputs risk of failure of one revenue generating unit of a plurality of revenue generating units of the company on the company, based on computing a statistical distribution of the plurality of revenue generating units when fed a plurality of fifth types of data elements, (vii) outputs measures and/or prediction parameters based on an analysis of a sixth type of data elements indicative of users accessing a web site associated with the company, and/or based on an analysis of a seventh type of data elements indicative of users interacting with presented advertisements, (viii) outputs an indication of employee replacement within the company based on an analysis of employee profiles posted on social networks hosted by external social network servers and/or additional external sources hosted by network nodes, (ix) outputs an indication of real time short and/or long term cost predictions and/or detected expected significant cost changes due to external contractor contrast, and/or changes in supplied service prices, and/or bill of materials (BOM) and/or ongoing purchase orders, based on an analysis of commitments including contracts and/or purchase orders obtained via enterprise resource planning (ERP) system integration.

15. The method of claim 1, wherein a respective set of adjusted sub-values is computed for each one of the plurality of sub-values, by computing a respective set of the plurality of simulated adjustments for each one of the plurality of sub-values, and applying the respective set of the plurality of simulated adjustments to the corresponding one of the plurality of sub-values.

16. The method of claim 1, wherein the simulated adjustments to a respective sub-value of the plurality of sub-values are selected from a group consisting of: an increase in the respective sub-value, a decrease in the respective sub-value, and creation of a new sub-value.

17. The method of claim 1, further comprising:
identifying at least one most influential raw data element of the plurality of raw data elements having greatest impact on the entity parameter;
wherein the computing the plurality of simulated adjustments is performed for sub-values outputted by at least one ML-sub-model of the plurality of ML-sub-models that receive the at least one most influential raw data element as input.

18. The method of claim 1, wherein a respective plurality of simulated adjustments are computed for each respective sub-value of the plurality of obtained sub-values, and the respective plurality of simulated adjustments are applied to the respective sub-value of the plurality of obtained sub-values outputted by the plurality of ML-sub-models to generate a plurality of adjusted sub-values for each respective sub-value.

19. A method of dynamically and iteratively using a ML model ensemble for computing likelihood of an entity failing to meet a target parameter, comprising:
in a plurality of first iterations:
receiving a request from an entity to obtain a target parameter;
receiving a plurality of raw data elements extracted by code sensors installed on a plurality of network nodes and injected into a server in real time;
inputting the plurality of raw data elements into a plurality of ML-sub-models;
obtaining a plurality of sub-values from the plurality of ML-sub-models
in a plurality of second iterations:
computing, based on a probabilistic simulation model and a set of prior distribution, given or calculated from the raw data elements, a plurality of simulated adjustments for the plurality of obtained sub-values outputted by the plurality of ML-sub-models;
applying the respective plurality of simulated adjustments to the plurality of obtained sub-values outputted by the plurality of ML-sub-models to generate a plurality of adjusted sub-values for the plurality of obtained sub-values;
inputting the plurality of adjusted sub-values for the plurality of obtained sub-values computed by applying the plurality of simulated adjustments to the outputs of the plurality of ML-sub-models, into a principal ML model;
obtaining from the principal ML model in the plurality of second iterations, a plurality of simulated values for the entity parameter in response to the inputting of the plurality of adjusted sub-values for the plurality of obtained sub-values computed by applying the plurality of simulated adjustments to the outputs of the plurality of ML-sub-models;
inputting the plurality of simulated values outputted by the principal ML model in the plurality of iterations in response to the inputting of the plurality of adjusted sub-values for the plurality of obtained sub-values computed by applying the respective plurality of simulated adjustments to sub-values outputted by the plurality of ML-sub-models, into a risk classifier that computes a likelihood of the entity failing to meet the target parameter according to an analysis of the plurality of simulated values for the entity parameter,
wherein the risk classifier is generated based on a few shot or single shot training approach using the plurality of raw data elements as initial input, by generating additional synthesized data for generating the risk classifier by computing and using the plurality of simulated values for the entity parameter outputted by the principal ML model in the plurality of iterations in response to the inputting of the plurality of adjusted sub-values for the plurality of obtained sub-values computed by applying the respective plurality of simulated adjustments to the plurality of ML-sub-models inputted with the plurality of raw data elements;
automatically providing the target parameter to the entity when the likelihood is below a threshold; and automatically denying the request for the target parameter when the likelihood is above the threshold.

20. The method of claim 19, further comprising:
iteratively obtaining updates of the plurality of raw data elements;
iteratively inputting the updates of the plurality of raw data elements into the plurality of ML-sub-models to obtain updated respective sub-values;
in a plurality of updated iterations:
  computing the plurality of simulated adjustments to the plurality of updated respective sub-values to obtain a plurality of adjusted updated sub-values;
  inputting the plurality of adjusted updated sub-values into the principal ML model;
  obtaining a plurality of simulated updated values for the entity parameter;
inputting the plurality of simulated updated values into the risk classifier for generating an updated likelihood of the entity failing to meet the target parameter according to an analysis of the plurality of simulated updated values for the entity parameter.

21. The method of claim 19, further comprising: computing a trend according to an iteratively computed updated likelihood of the entity parameter failing to meet the target parameter, and extrapolating the trend to a future time for predicting a trend when the likelihood of the entity failing to meet the target parameter is above a threshold.

22. The method of claim 19, further comprising:
monitoring for a change in statistics of at least one of the plurality of raw data elements; and
triggering iterations in response to the change.

23. The method of claim 19, wherein in response to iteratively obtaining updates of the plurality of raw data elements, an interactive graphical user interface (GUI) presented on a display of a client terminal is dynamically updated with an indication of an entity score indicative of likelihood of the entity failing to meet the target parameter, and an amount of pre-approved funding available for a company determined based on dynamically computed likelihood of obtaining sufficient financial assets to pay back the pre-approved funding.

24. The method of claim 23, further comprising:
receiving, via the GUI, a request for an amount of funding up to the amount of pre-approved funding presented in the GUI, and
automatically providing the amount of funding to an account of the company.

25. A system for generating a machine learning (ML) model ensemble for computing likelihood of an entity failing to meet a target parameter, comprising:
at least one hardware processor executing a code for:
training a plurality of ML-sub-models that each respectively output sub-values in response to an input of raw data elements;
training a principal ML model that outputs a value of an entity parameter corresponding to the target parameter in response to an input of the plurality of sub-values outputted by the plurality of ML-sub-models, using a training dataset including for each of a plurality of sample entities, the plurality of ML-sub-values and corresponding entity parameters;
inputting a plurality of raw data elements associated with the entity into the plurality of ML-sub-models to obtain an output of respective sub-values;
in a plurality of iterations:
  computing, based on a probabilistic simulation model and a set of prior distribution, given or calculated from the raw data elements, a plurality of simulated adjustments for the plurality of obtained sub-values outputted by the plurality of ML-sub-models;
  applying the respective plurality of simulated adjustments to the plurality of obtained sub-values outputted by the plurality of ML-sub-models to generate a plurality of adjusted sub-values for the plurality of obtained sub-values;
  inputting the plurality of adjusted sub-values for the plurality of obtained sub-values computed by applying the plurality of simulated adjustments to the outputs of the plurality of ML-sub-models, into the principal ML model;
  obtaining from the principal ML model in the plurality of iterations, a plurality of simulated values for the entity parameter in response to the inputting of the plurality of adjusted sub-values for the plurality of obtained sub-values computed by applying the plurality of simulated adjustments to the outputs of the plurality of ML-sub-models; and
generating a risk classifier that generates a likelihood of the entity failing to meet the target parameter according to an analysis of the plurality of simulated values for the entity parameter outputted by the principal ML model in the plurality of iterations in response to the inputting of the plurality of adjusted sub-values for the plurality of obtained sub-values computed by applying the respective plurality of simulated adjustments to sub-values outputted by the plurality of ML-sub-models,
wherein the risk classifier is generated based on a few shot or single shot training approach using the plurality of raw data elements as initial input, by generating additional synthesized data for generating the risk classifier by computing and using the plurality of simulated values for the entity parameter outputted by the principal ML model in the plurality of iterations in response to the inputting of the plurality of adjusted sub-values for the plurality of obtained sub-values computed by applying the respective plurality of simulated adjustments to the plurality of ML-sub-models inputted with the plurality of raw data elements.

* * * * *